United States Patent
McAlister

(10) Patent No.: US 9,404,443 B2
(45) Date of Patent: Aug. 2, 2016

(54) METHODS FOR JOULE-THOMPSON COOLING AND HEATING OF COMBUSTION CHAMBER EVENTS AND ASSOCIATED SYSTEMS AND APPARATUS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 0 days.

(21) Appl. No.: 14/211,038

(22) Filed: Mar. 14, 2014

(65) Prior Publication Data

US 2015/0040848 A1 Feb. 12, 2015

Related U.S. Application Data

(60) Provisional application No. 61/794,529, filed on Mar. 15, 2013, provisional application No. 61/801,452, filed on Mar. 15, 2013, provisional application No. 61/922,744, filed on Dec. 31, 2013.

(51) Int. Cl.

| | |
|---|---|
| *F01N 5/02* | (2006.01) |
| *F02M 25/00* | (2006.01) |
| *F02M 21/02* | (2006.01) |
| *F02M 21/06* | (2006.01) |
| *F02M 25/12* | (2006.01) |
| *F02D 19/06* | (2006.01) |
| *F02B 17/00* | (2006.01) |
| *F02B 47/04* | (2006.01) |
| *F02D 41/00* | (2006.01) |
| *F02D 41/30* | (2006.01) |
| *F02M 31/16* | (2006.01) |
| *F02B 47/08* | (2006.01) |

(52) U.S. Cl.
CPC ............... *F02M 25/00* (2013.01); *F02B 17/00* (2013.01); *F02B 47/04* (2013.01); *F02B 47/08* (2013.01); *F02D 19/06* (2013.01); *F02D 41/0025* (2013.01); *F02D 41/3094* (2013.01); *F02M 21/0206* (2013.01); *F02M 21/0248* (2013.01); *F02M 21/06* (2013.01); *F02M 25/12* (2013.01); *F02M 31/166* (2013.01); *Y02T 10/121* (2013.01); *Y02T 10/32* (2013.01); *Y02T 10/36* (2013.01)

(58) Field of Classification Search
CPC ....... F02M 25/07; F02M 25/10; F02M 25/12; F02M 21/0206; F02N 5/02; F02B 2075/125; Y02T 10/121
USPC .......................................................... 123/1 A
See application file for complete search history.

(56) References Cited

U.S. PATENT DOCUMENTS

| | | | | |
|---|---|---|---|---|
| 3,060,913 | A * | 10/1962 | May ............................... 123/297 |
| 5,718,194 | A * | 2/1998 | Binion ......................... 123/25 C |
| 5,884,488 | A * | 3/1999 | Gram et al. .................... 62/50.6 |
| 6,756,140 | B1 * | 6/2004 | McAlister ..................... 429/411 |
| 2004/0177837 | A1 * | 9/2004 | Bryant ........................ 123/559.1 |

* cited by examiner

*Primary Examiner* — Lindsay Low
*Assistant Examiner* — Kevin Lathers
(74) *Attorney, Agent, or Firm* — Perkins Coie LLP

(57) ABSTRACT

A method for operating an internal combustion engine including a combustion chamber and configured to perform at least a compression stroke and a power stroke. The method comprises direct injecting a first substance having a positive Joule-Thomson coefficient into the combustion chamber during a compression stroke, thereby reducing an amount of work otherwise may be used to perform the compression stroke and direct injecting a second substance having a negative Joule-Thomson coefficient into the combustion chamber during a power stroke, thereby increasing an amount of work otherwise produced from the power stroke.

18 Claims, 24 Drawing Sheets

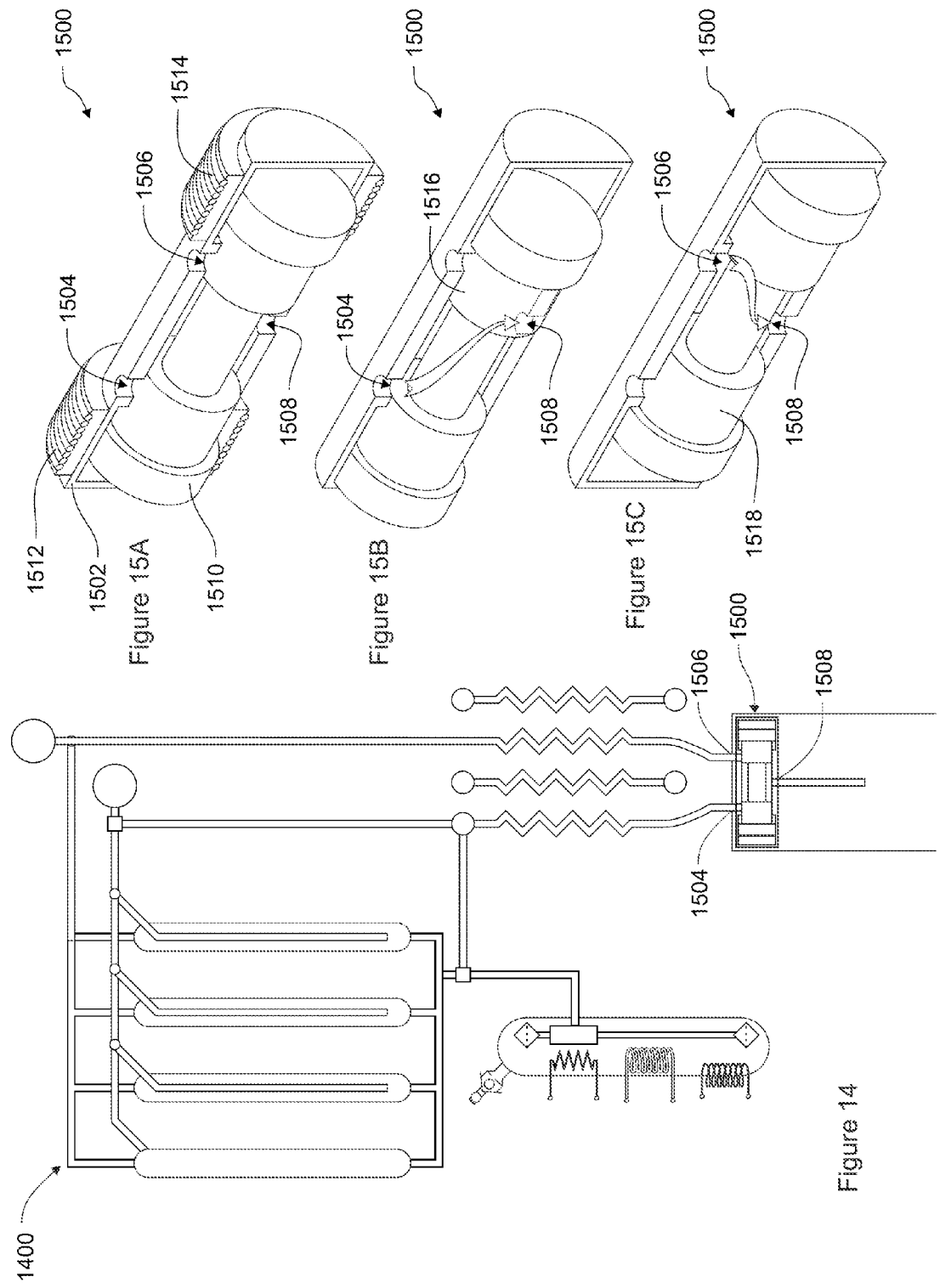

METHODS FOR JOULE-THOMPSON COOLING AND HEATING OF COMBUSTION CHAMBER EVENTS AND ASSOCIATED SYSTEMS AND APPARATUS

CROSS-REFERENCE TO RELATED APPLICATIONS

The present application claims the benefit of U.S. Provisional Patent Application No. 61/794,529, filed Mar. 15, 2013, U.S. Provisional Patent Application No. 61/801,452, filed Mar. 15, 2013, and U.S. Provisional Patent Application No. 61/922,744, filed Dec. 31, 2013, the disclosures of which are hereby incorporated herein by reference in their entireties.

BACKGROUND

The present transportation intensive phase of the Industrial Revolution has produced an inventory of about 1-billion internal combustion engines that have been designed for operation with gasoline or diesel fuel. This population of engines is mostly comprised of four-stroke or cycle types and, to a lesser extent, two-stroke or cycle types of reciprocating piston designs. Cyclic operation of intake, compression, power, and exhaust events characterize both types of engines.

Gasoline and diesel fuels have been proven to be objectionable to the environment. These fossil fuels are unacceptable because of toxic emissions that cause smog and particulate-related diseases in congested traffic areas along with climate changes and global warming. Because such fuels comprise portions of civilization's dependence upon burning more than a million years' of finite fossil fuel accumulations each year, for most of the world's population, continued depletion causes economic insecurity and inflation, balance of trade deficits, hardship, and conflicts for control of remaining supplies.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various views unless otherwise specified.

FIG. 14 is a schematic representation of a fluid delivery system according to a representative embodiment;

FIG. 15A is perspective view in partial cross-section of a representative fluid delivery control valve;

FIG. 15B is a perspective view in partial cross-section of the valve shown in FIG. 15A in a first position; and FIG. 15C is a perspective view in partial cross-section of the valve shown in FIG. 15A in a second position.

DETAILED DESCRIPTION

Figure 1A:
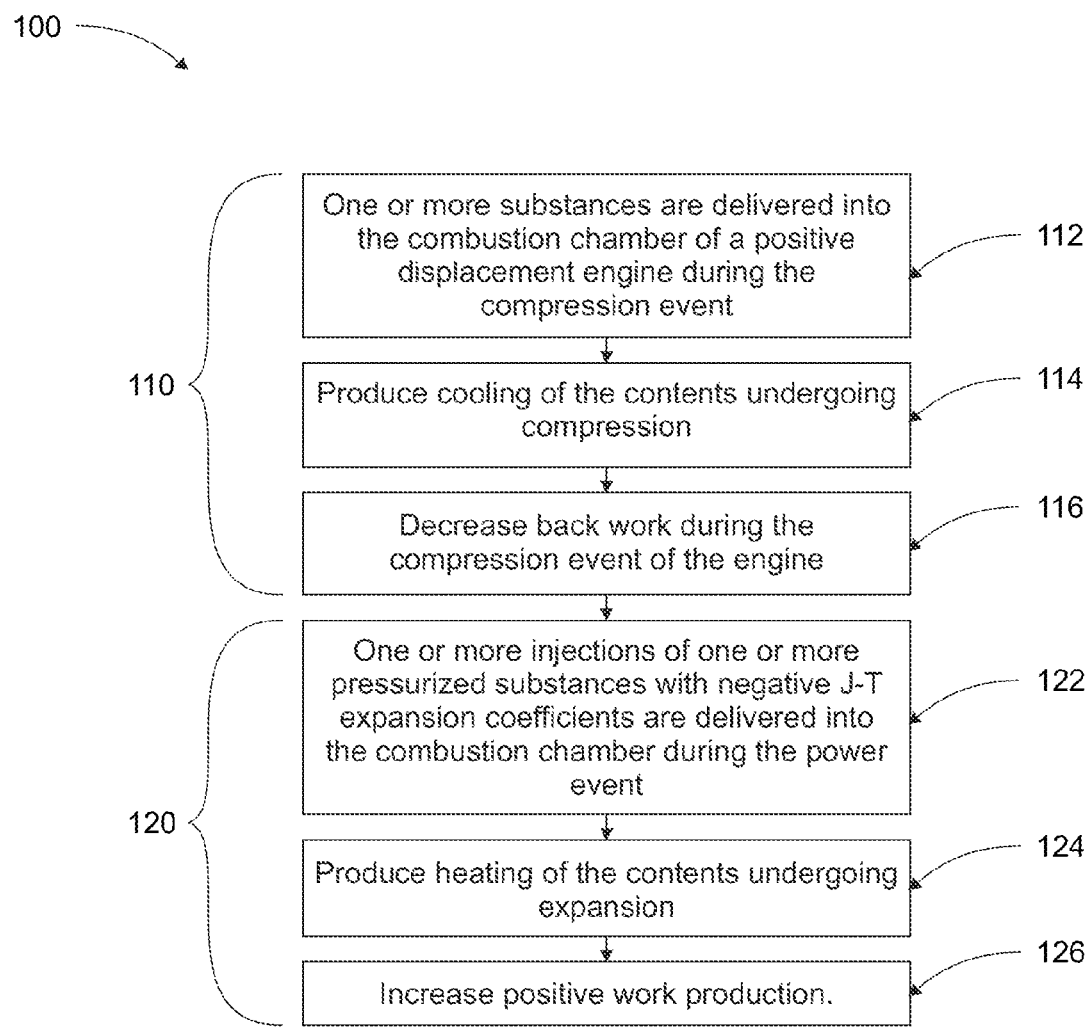
FIG. 1A shows a flow diagram illustrating a process for producing cooling and reducing back work in a combustion engine according to a representative embodiment.

Specific details of several embodiments of the technology are described below with reference to FIGS. 1-15C. Other details describing well-known structures and systems often associated with ignition systems, fuel systems and electronic valve actuation, such as fuel pumps, regulators and the like, have not been set forth in the following disclosure to avoid unnecessarily obscuring the description of the various embodiments of the technology. Many of the details, dimensions, angles, steps, and other features shown in the figures are merely illustrative of particular embodiments of the technology. Accordingly, other embodiments can have other details, dimensions, angles, steps, and features without departing from the spirit or scope of the present technology. Therefore, a person of ordinary skill in the art will accordingly understand that the technology may have other embodiments with additional elements, or the technology may have other embodiments without several of the features shown and described below with reference to FIGS. 1-15C.

Some aspects of the technology described below may take the form of, or make use of, computer-executable instructions, including routines executed by a programmable computer or controller. Those skilled in the relevant art will appreciate that aspects of the technology can be practiced on computer systems other than those described herein. Aspects of the technology can be embodied in one or more computers or data processors, such as an engine control unit (ECU), engine control module (ECM), fuel system controller, ignition controller or the like that is specifically programmed, configured or constructed to perform one or more computer-executable instructions consistent with the technology described below. Accordingly, the term "computer," "processor" or "controller", as may be used herein, refers to any data processor, and can include ECUs, ECMs, and modules, as well as Internet appliances and hand-held devices (including diagnostic devices, palm-top computers, wearable computers, cellular or mobile phones, multi-processor systems, processor-based or programmable consumer electronics, network computers, mini computers and the like). Information handled by these computers can be presented on any suitable display medium, including a CRT display, LCD, or dedicated display device or mechanism (e.g., a gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

Embodiments of the disclosed technology enable conversion of internal combustion engines to operation on renewable fuels such as hydrogen and methane derived from solar, wind, wave, or geothermal energy, along with organic wastes to thereby extend the life and improve the performance of existing motorized equipment and increase the return on energy invested to produce such equipment.

Economic and environmental benefits may include conversion of high production transportation engines to distributed heat and power applications that double energy-utilization efficiency compared to conventional nuclear and coal-fueled central power plants. Communities can produce renewable energy from such combined heat and power applications based upon such converted engines to enable eventual achievement of sustainable prosperity. Existing and/or new natural gas distribution infrastructures can also provide greater returns on energy invested to produce and install such systems, as a result of participation in sustainable economic developments that are facilitated by the embodiments shown.

Fuels that are gaseous at ambient conditions, such as natural gas, methane and hydrogen, present storage and fuel-injection pressurization problems compared to petrol liquids such as gasoline and diesel fuel. In addition, natural gas and methane present different combustion characteristics including relatively slow flame speed compared to petrol fuels. Endothermic Thermochemical Regeneration (TCR) conversion of fuels such as natural gas with an oxygen donor, such as steam, may produce a mixture with variable proportions of hydrogen, methane, carbon monoxide, carbon dioxide, and water vapor.

TCR may be beneficial to overall fuel efficiency, as heat that is normally wasted from internal combustion engines and/or vehicles propelled by such engines can be utilized as endothermic heat for TCR production of hydrogen characterized fuels with increased pressure and chemical fuel potential energy along with far faster flame speeds, and for improved operation of internal combustion engines. Some embodiments provide for improving the overall benefits of cryogenic liquid or pressurized gas storage of natural gas, along with much greater combustion efficiency to provide improved fuel efficiency and performance, along with greatly reduced exhaust emissions.

In certain embodiments, hydrogen donor fuels such as ammonia, methylamine, urea, and various hydrocarbons are utilized in a combustion engine and/or fuel cell to produce exhaust gases that contain condensable water. Such water is utilized as a pressurizing agent that can be quickly converted to steam to assist delivery from a fuel storage step to a pressure amplifying step, and may further serve as an oxygen donor in TCR reaction steps to produce pressurized hydrogen, along with other TCR products.

Many gases produce cooling upon expansion (sometimes called expansion cooling) and have positive Joule-Thomson (J-T) coefficients of expansion. Neon, helium and hydrogen are exceptions and have negative J-T coefficients of expansion and therefore heat upon expansion (sometimes called J-T expansion heating). Natural gas, methane, ammonia, and all of the remaining TCR product substances including carbon monoxide, carbon dioxide, water, ammonia, nitrogen, and hydrocarbons have positive J-T expansion coefficients and, accordingly, upon expansive addition during an engine's compression event, produce cooling and reduce the pressure and thus reduce the work of compression or back work. This type of beneficial operation includes direct injection and expansion at one or more adaptively controlled crank angles near, at, or Before Top Dead Center (BTDC) to provide stratified, homogeneous or another mixture characterization for cooling, and thus reduces effective pressure and the net work of compression or back work. Positive J-T substances or fluids include gases, vapors and mixtures with liquid constituents including cryogenic and other substances that are cooler than the ambient atmosphere and/or the gases that are heated by compression.

The Joule-Thomson behaviors for a fluid are revealed by the slope of the constant enthalpy (isenthalp) values at a chosen temperature versus pressure in a T-P plot—the Joule-Thomson (J-T) coefficient. Such plots may be generated by use of the REFPROP 9.0 program, developed by the National Institute for Standards and Technology (NIST). When the slope is positive, a decrease in pressure by expansion of the fluid will produce Joule-Thomson cooling. Conversely, when the expansion is done within the region where the slope is negative, Joule-Thomson heating will occur. Effective heating or cooling happens in the regions of the curve farthest from the inversion point (where the slope of the curve is zero) on that curve.

To develop exemplary information about the preferred starting conditions for the processes, three fluids were selected and modeled at several constant enthalpy (isenthalp) values. T-P plots were modeled for three fluids (CO, $CH_4$, and $H_2$) at several constant enthalpy (isenthalp) values. The selected isenthalp values for CO were 9, 12, 15, and 18 kJ/mol, giving data for temperatures ranging from 230 to 495 K (−43 to 222° C.) over pressures from 20 to 500 bar. For $CH_4$, the isenthalps were 12, 16, 20, 24 and 28 kJ/mol, and these had a temperature range from 230 to 617 K (−43 to 344° C.) over pressures from zero to 500 bar. Isenthalp curves for normal $H_2$ calculated at 8, 12, 16, 20, 24 and 28 kJ/mol gave results in the temperature range 280 to 980 K (7 to 707° C.), also over pressures from zero to 500 bar.

Derivatives (the J-T coefficients) at isenthalpic curve points for CO were positive (J-T cooling) for the lower enthalpy curve, 9 kJ/mole. The inflection point was at 248 bar (3597 psi) and 385 K (112° C.). Calculations show the cooling that will occur when expansion of CO is done from the inflection point at 112° C. and 248 bar to lower pressure, e.g., 20 bar (290 psi) will be 54.7° C. Starting with colder carbon monoxide produces a greater drop in temperature upon expansion. In some embodiments, the positive J-T fluid is stored as cryogenic or cool fluid or pre-cooled to between about 100° C. and about 1000° C. less than the temperature of gases inside the combustion chamber.

Methane is similar to CO, where J-T cooling upon expansion comes on lower isenthalp curves. The inflection point for 12 kJ/mole of $CH_4$ was at 485 bar (7034 psi) and 319 K (46° C.). Calculations show the cooling that will occur when expansion of $CH_4$ is done from the inflection point at 46° C. and 485 bar to lower pressure, e.g., 20 bar (290 psi) will be 82.2° C. As with CO, more cooling can be accomplished by starting with colder methane such as precooled gas or fluids from cryogenic storage. Benefits including reduction of the work of compression of such cooling by fuel substances are gained by injecting a stratified charge or multiple layers or zones of stratified charge in a high temperature region (generally core regions) of the air or oxidant inventory undergoing heating by compression. Subsequently upon combustion the greatest heat to work conversion efficiency is enabled because the heat of combustion is insulated by surrounding air or oxidant.

For normal hydrogen, all the J-T coefficients are negative over these pressures, and the isenthalps were quite linear in the 0-500 bar range. As this is just the opposite of the CO and $CH_4$ behavior, the more negative derivatives at isenthalp curve points, i.e., J-T coefficients that indicate J-T heating upon expansion, are on higher value enthalpy curves. Measurements on the 28 kJ/mol isenthalp show the heating that will occur when expansion of 678° C. normal $H_2$ is done from 500 bar (7252 psi) to the lower pressure of 20 bar (290 psi). The 8 kJ/mol isenthalp indicates a smaller rise in temperature from the same drop in pressure, but the starting temperature was at 7° C., which being below room temperature may be sourced or utilized in conjunction with cryogenic and other cooler than ambient temperature fluids. However more heating can actually be accomplished starting with warmer hydrogen and can be readily accomplished by pre-heating from heat sources such as engine coolant, exhaust gases and/or regenerative energy from shock absorbers, driveline deceleration, or streamlining.

Therefore, regarding expansive cooling, cryogenic fluids and/or to pre-cool methane, CO, CH4, etc. may be utilized, before expanding from the highest pressure available to provide the reduction of back work during compression BTDC and then, to expand from a high pressure and temperature hydrogen available to increase the heat release upon expansion at or after top dead center (TDC).

In some embodiments, such hot, pressurized hydrogen is produced by high temperature reactions including endothermic dissociation or respeciation and/or by hydrogen separation through a proton membrane and/or by galvanic pressurization or electrolysis and/or other suitable filtration and separation from positive J-T expansion substances. Thus, some embodiments provide one or more injections after TDC of hydrogen pre-heated to temperatures such as 500° C. or greater and pressures such as 350 Bar (5145 psi) or greater compared to the gases in the combustion chamber. Depending upon adaptive control according to compression ratio, combustion chamber geometry, swirl, compressor boost, piston speed, and choices of ignition such as spark, Lorentz ion thrusting and/or corona acceleration such high temperature and high pressure hydrogen injections are timed to benefit the net BMEP, fuel efficiency and minimize or eliminate objectionable exhaust emissions. In many instances such adjustments occur in a range from TDC to about 90° crank angle after TDC.

Generally Injection cooling patterns before TDC of expansive cooling fluid may provide beneficial results. Compression heating of air in practical engines produces substantial thermal gradients in which air near cooler combustion chamber surfaces surrounds hotter air within such surrounding air. Embodiments that utilize one or more injections of positive J-T expansion cooling fluid into such hotter air inventories provide particularly effective reduction of back work. This benefit can be maximized by adaptive control of the crank angle timing along with the penetration and pattern of positive J-T expansion coolant injection in response to instrumentation that monitors any one of, or a combination of: crank angle status; peak temperature of combustion chamber fluid; pressure of combustion chamber fluid; and/or acceleration/deceleration of the engine as indicated by suitable combustion chamber sensors of temperature, pressure and injection patterns and/or interconnected motions of components, such as piston, crank, flywheel, cam, distributor or the like.

FIG. 1A shows a flow diagram illustrating a Process 100 for producing cooling and reducing back work in a combustion engine. In one embodiment, step 110 shows a process in which one or more pressurized substances with positive J-T expansion coefficients produce cooling and decrease back work during the compression event of a positive displacement internal combustion engine. In subprocess 112, one or more pressurized substances that produce expansive cooling are introduced into the combustion chamber during a compression event. The substances can be introduced as a gas, vapor, or a mixture, including liquid or solid phases such as may be conveyed from pressurized gas, liquid, or cryogenic storage conditions. In an embodiment, the positive J-T substance can be pressurized by conversion of a portion of liquid such as a cryogenic liquid phase of the substance into a gas phase. Substances that produce positive J-T expansion cooling include types that are chemically compounded with hydrogen, carbon and/or or nitrogen content. In subprocess 114, the introduced substances produce cooling of the contents undergoing compression and reduce back work. In subprocess 116, back work is decreased as pressure is reduced during the compression event of the engine.

Process step 110 may or may not accompany process 120, which utilizes a pressurized negative J-T expansion agent such as helium, neon and/or hydrogen to produce heat and increase positive work production during the power event of a positive displacement internal combustion engine. In this step, one or more negative J-T expansion substances such as hydrogen can be introduced as a gas, vapor, or derived from a mixture including liquid or solid phase hydrogen such as may be conveyed from pressurized gas, liquid, or cryogenic storage conditions, including a cryogenic hydrogen slush mixtures of solid, liquid, and/or gas phases. In subprocess 122, one or more injections of one or more pressurized substances with negative J-T expansion coefficients are delivered into the combustion chamber during the power event. In an embodiment, the substance is conditioned (e.g., cooled, compressed, heated, etc.) such that it undergoes a phase change upon injection. For example, liquid hydrogen, helium, and/or neon can phase change to pressurized gaseous hydrogen, etc., upon injection and/or such pressurized hydrogen can be further heated to produce greater heating upon J-T expansion after TDC. In subprocess 124, the negative J-T coefficient contents undergoing expansion are heated. As a result of this new cycle of operation as shown in subprocess 126, greater positive net work occurs. In some embodiments, the addition of ions of hydrogen, helium, and/or neon can further improve (i.e. increase the expansive heating benefit) of the negative J-T coefficient of the injected substances. Thus, the ions can provide greater expansive heating.

Figure 1B:
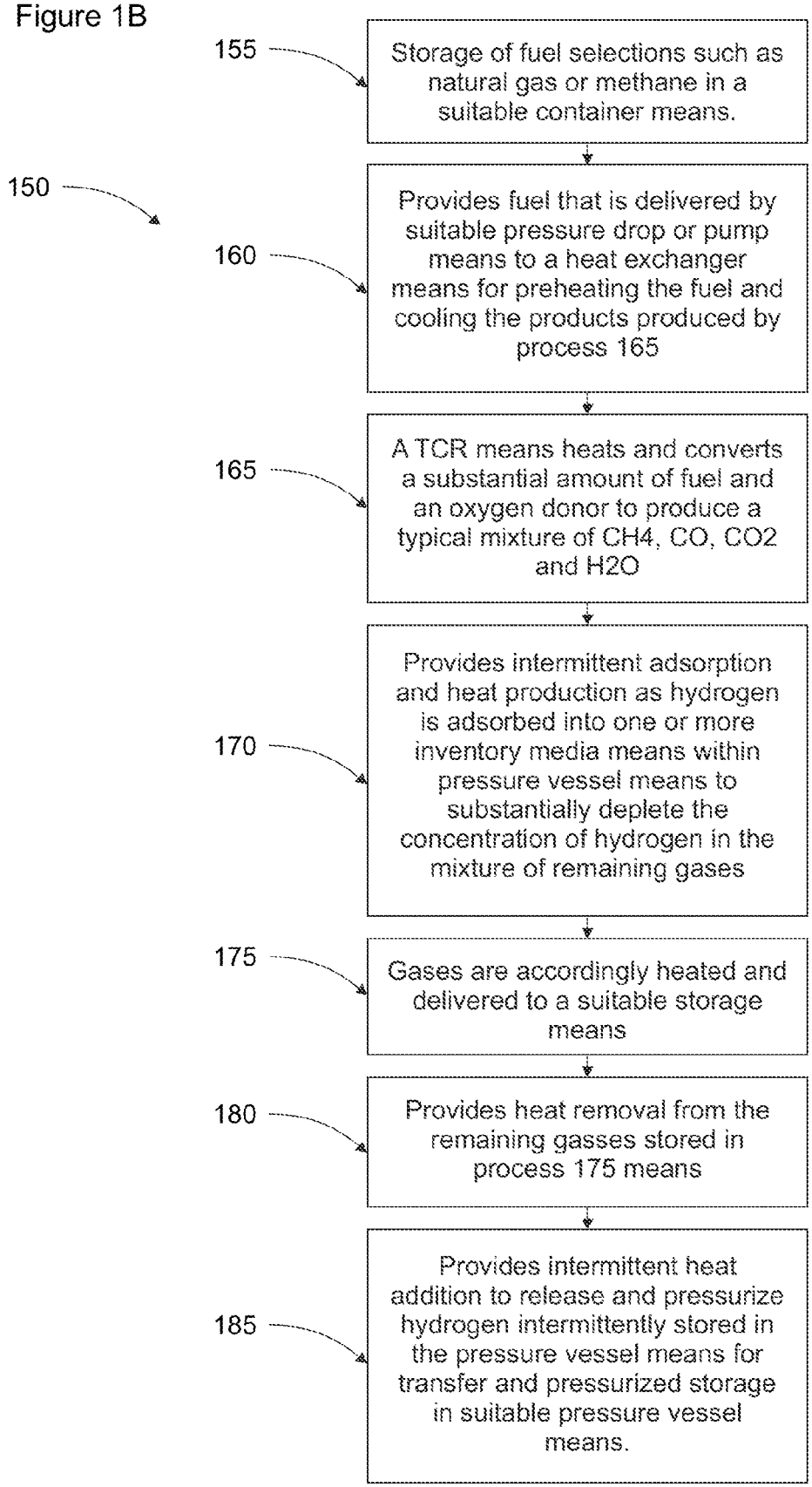
FIG. 1B is a flow diagram illustrating a process for producing an inventory of pressurized hydrogen and a separate inventory of gases such as natural gas.

FIG. 1B is a flow diagram illustrating a Process 150 for producing a separate inventory of pressurized hydrogen from another inventory of gases such as natural gas, methane, carbon monoxide, carbon dioxide, and water vapor from thermochemical reformation of hydrocarbon fuels and an oxygen donor such as steam. Process 155 provides storage of fuel selections such as natural gas or methane in a suitable container. Process 160 provides fuel that is delivered by suitable pressure drop or pump to a heat exchanger for preheating the fuel and cooling the products produced. Process 165 describes a method whereby a TCR heats and converts a substantial amount of fuel such as methane and an oxygen donor to produce a mixture of $H_2$, $CH_4$, $CO$, $CO_2$, $H_2O$, and/or constituents such as $NH_3$ and $N_2$. Process 170 provides filtration, intermittent adsorption and heat production as hydrogen is removed or adsorbed into one or more inventory media within a pressure vessel to substantially deplete the concentration of hydrogen in the mixture of remaining gases that are accordingly heated and delivered in Process 175 to a suitable storage. Process 180 provides heat removal from the remaining gases stored in the Process 175. Process 185 provides intermittent heat addition to release and pressurize hydrogen stored in the pressure vessel for transfer and pressurized storage in suitable pressure vessel.

Figure 5A:
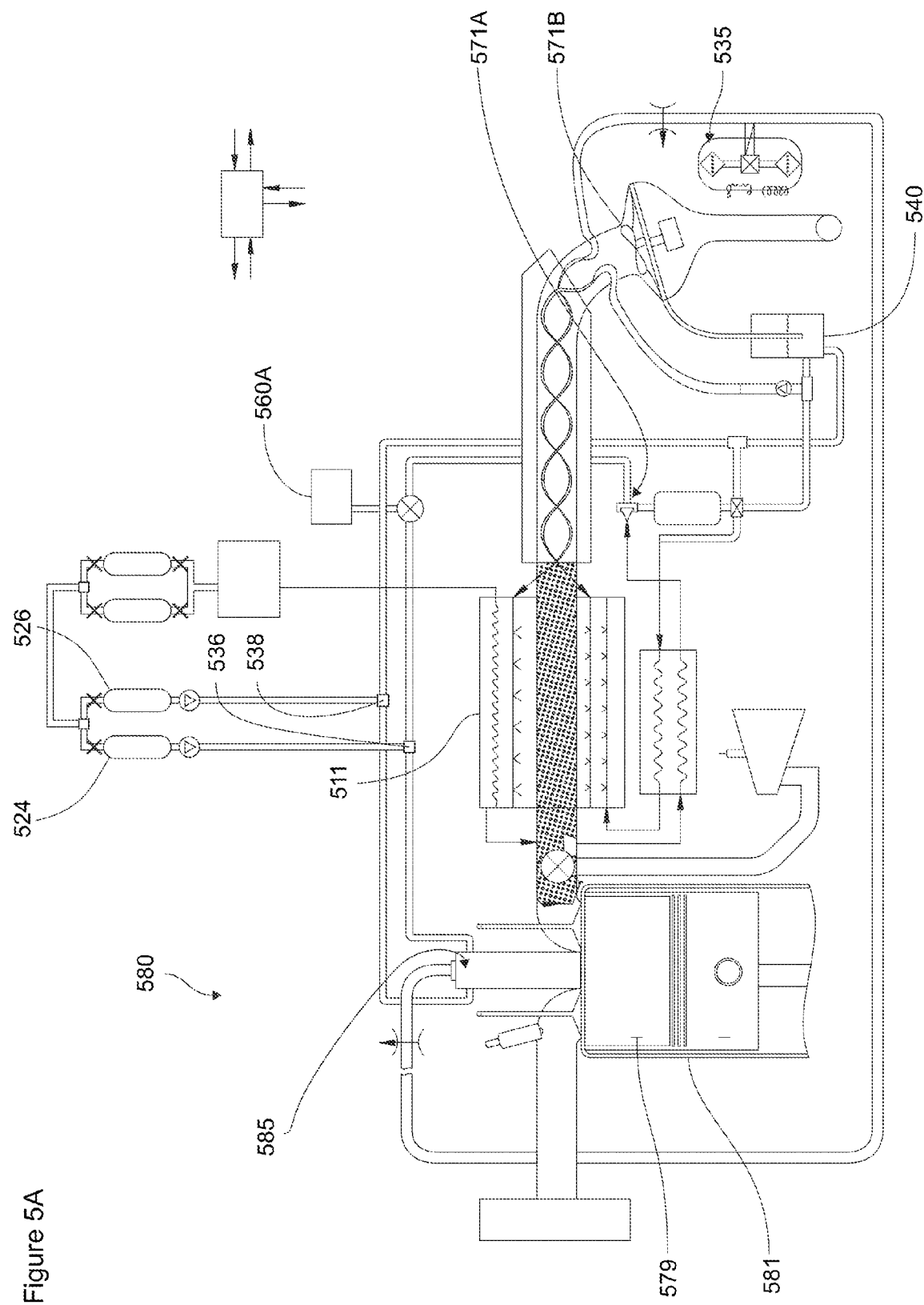
FIGS. 5A-5C illustrate apparatuses for reforming operations, such as may be provided by various disclosed systems to provide mixed TCR reaction products such as hydrogen.
Figure 5B:
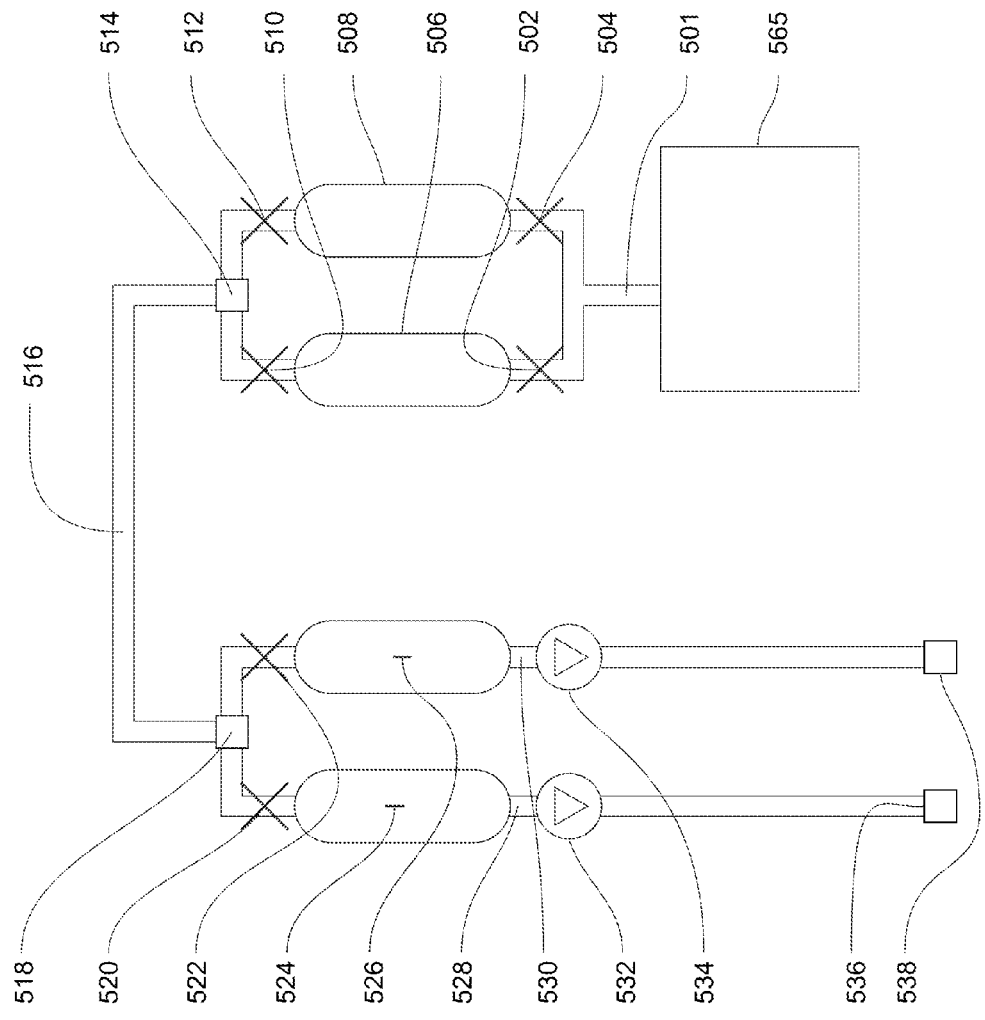

Reforming operations, such as may be provided by various systems including the system of FIG. 5A to provide mixed TCR reaction products such as hydrogen, methane, carbon monoxide, carbon dioxide, and water vapor that are delivered from reactor vessel 511 and stored in vessel 565. Reactor vessel 511 receives a hydrogen donor source, such as natural gas from storage system 535. For example, the hydrogen donor can include ammonia, urea, methane and/or other hydrocarbons. Thermochemical regeneration as disclosed in U.S. Patent Application No. 2011/0220040, filed Feb. 14, 2011, the disclosure of which is incorporated herein by reference in its entirety, provides details of related operations of other components shown in FIG. 5A. To the extent the foregoing application and/or any other materials incorporated herein by reference conflicts with the present disclosure, the present disclosure controls.

Hydrogen donors such as hydrocarbons are endothermically dissociated and/or reacted with an oxygen donor, such as steam, within reactor vessel 511. Such steam may be collected from vessel 511 and/or the exhaust of engine 581 and may include heat exchanges to produce an inventory of condensed water in vessel 540 to facilitate TCR reactions such as shown in Equation 1.

$$CH_4+H_2O+HEAT \rightarrow CO+3H_2 \qquad \text{Equation 1}$$

Depending upon factors such as the amount of heat addition, the pressure and temperature of the reaction, and the process time allowed for the reaction, steam and/or methane may be present in the products as shown generally but not quantitatively in Equation 2.

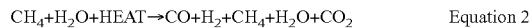

$$CH_4+H_2O+HEAT \rightarrow CO+H_2+CH_4+H_2O+CO_2 \qquad \text{Equation 2}$$

Reaction products such as shown in Equation 2 are stored in vessel 565 and delivered through line 501 and through valves 502/504 to vessels 506/508, which are loaded with a receiving medium such as a hydride forming matrix or an adsorptive system for receiving and holding hydrogen. Various metal hydrides, zeolites, and/or adsorptive media such as activated carbon or the architectural constructs with graphite and/or single or multiple wall nanotubes and/or, graphene structures as may be produced from graphitized and other forms of chemical vapor depositions or from polymeric precursors and/or organic substances, petroleum or coal pitch to provide suitable media for collection of hydrogen and/or disclosed in U.S. patent application Ser. No. 13/584,644, entitled "METHODS FOR MANUFACTURING ARCHITECTURAL CONSTRUCTS," filed Aug. 13, 2012, now U.S. Pat. No. 8,828,491, the disclosure of which is incorporated herein by reference in its entirety.

Mixtures passing through vessels 506/508 thus become depleted of hydrogen that remains in vessels 506/508. The depleted mixture passing through vessels 506/508 receives substantial amounts of heat that is released by the process of hydrogen retention in the media within vessels 506/508. Not shown are subsystems for further heat exchange for cyclic removal or additions of heat from or to the hydrogen stored in vessels 506 or 508 as may be provided by electrically induced plasma, and/or resistance or induction heating, and/or by suitable fluid heat exchange with circulated substances such as engine coolant and/or exhaust gases.

Upon storage of hydrogen, heat is removed, and upon hydrogen release, heat is added to release and pressurize the hydrogen. This pressurization process provides for hydrogen to be compactly stored as a dense hydride constituent, chemisorbed, or otherwise contracted within layers or capillaries of the media and, upon heat addition, be released as gas with a much lower density and to thus become pressurized. Such pressurized hydrogen is routed out of pressure vessels 506/508 through a suitable circuit such as valves 510/512, three-way valve 514, line 516, three-way valve 518, valves 520/522 and stored as a pressurized gas in vessel 524. Pressure vessels 506/508 are similarly cyclically loaded with compactly stored hydrogen, and upon heat addition, become further pressurized with gaseous hydrogen that is released through valves 510/512 and three-way valve 514 by the circuit shown for storage in vessels 524.

Gas mixtures depleted of such hydrogen, alternately pass from vessel 506 or 508 to storage in vessels 526. Depending upon the crank angle timing of fuel injection events, the fuel stored in vessel 526 and/or 524 may be further heated and/or pressurized by one or more subsystems such as pumps such as 532 and/or 534 via conduits 528 and 530. Illustratively, compression and fuel injection depends on variables such as the crank angle timing, type of injection nozzle and the resulting pattern of injection, injection pressure difference and the resulting penetration distance and the combustion chamber geometry, particularly including the piston top topography, the injection of such fuel gases may produce stratified-charge, homogeneous charge, or various degrees of mixture concentration from surfaces such as the advancing piston, cylinder walls and engine head components.

Figure 6:
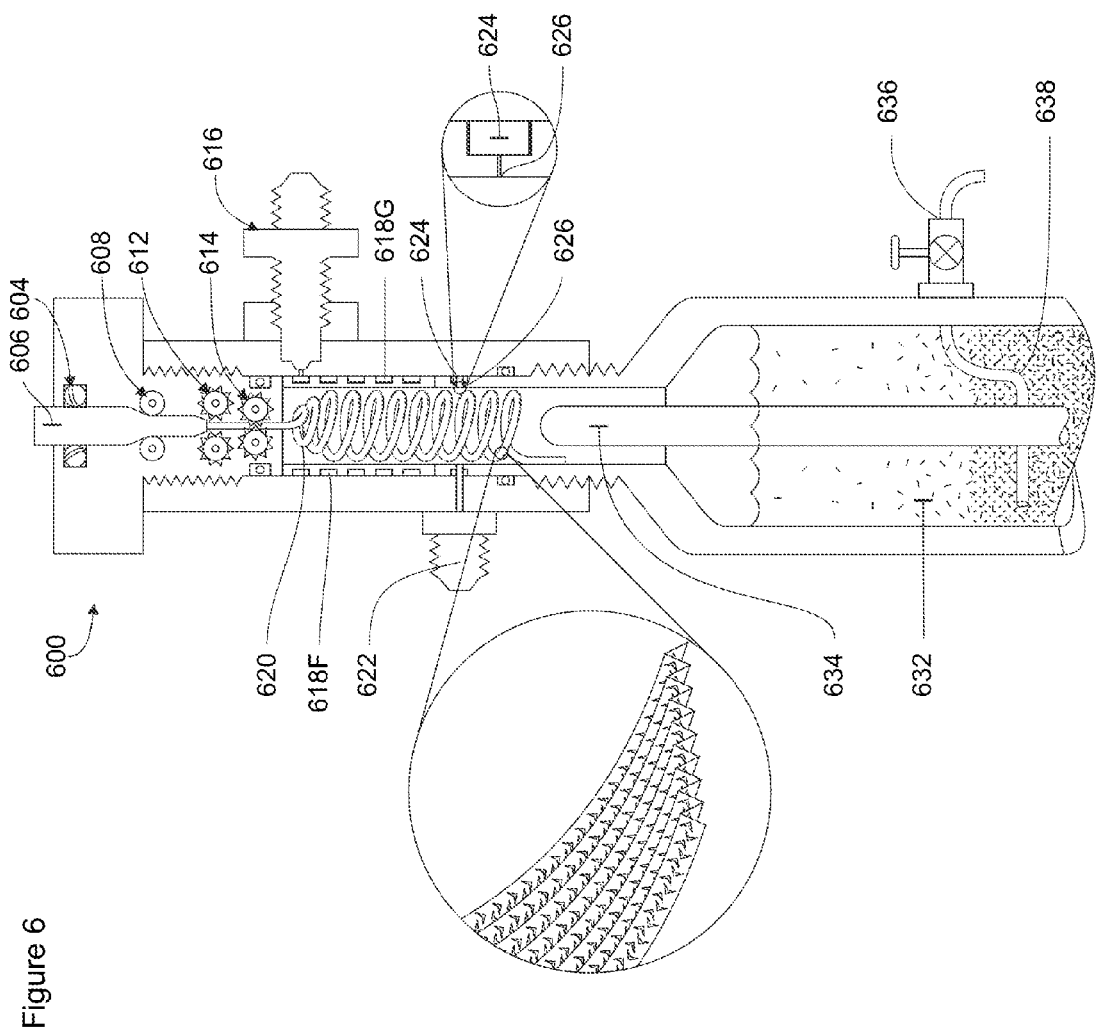
FIG. 6 is a schematic cross-sectional representation of an apparatus for hydrogen generation according to a representative embodiment.

In some embodiments, these variables are controlled to inject fuels from tank 524 and/or 526 and produce substantially stratified distribution of expansion cooling fuel constituents within compressed air during the compression stroke at a lean overall fuel/air ratio. Subsequently, hydrogen fuel from tanks 524 or another storage or production source such as hydrogen generator 600 as shown in FIG. 6 or 800 as shown in FIG. 8A is injected and ignited at crank rotation timing that provides the piston position at or after TDC to provide J-T expansion heating and accelerated ignition to very quickly start a cold engine. In certain embodiments after starting the engine, the crank angle timing of injection of fuel from tank 526 may be advanced to a position within the compression stroke that is closer to Bottom Dead Center (BDC) for the purpose of providing a homogeneous mixture or a stratified mixture that is positioned near selected surfaces such as the piston, cylinder wall, or exposed head component surfaces. Such fuel mixtures are subsequently combusted by injection of stratified hydrogen delivered from tank 524 before, at, or after TDC to increase the heat transfer to the piston and other combustion chamber surfaces for purposes of expediting engine warm up or maintenance of the desired operating temperature in stop and go driving cycles.

After reaching the desired engine operating temperature, fuel injected from tanks 526 is again injected at crank angle timing selected during the compression stroke to produce expansion cooling of stratified fuel-air mixtures that increase or benefit fuel efficiency and/or performance by reducing combustion chamber pressure and back work. At or after TDC, pressurized hydrogen from tank(s) 524 is injected and beneficially releases heat because of its negative coefficient of Joule-Thomson expansion. Such hydrogen can be ignited by spark, Lorentz ion thrusting and/or corona discharge to the pattern of hydrogen injection to improve or maximize power production and fuel economy.

Because hydrogen has a negative J-T expansion coefficient, it can be injected at or after TDC to be heated and/or to heat the gases present in a combustion chamber. Some embodiments provide ion-accelerated injection thrusting of such hydrogen to penetrate the stratified charge mixture of air and fuels such as methane, carbon monoxide, etc., to provide improved Brake Mean Effective Pressure (BMEP) per heating value of the fuels injected. This provides improvement over compression ignition that may use thermal ions for stimulating combustion. Back work for direct diesel fuel injection at 2000 to 3000 bar may use sprays of liquid droplets to undergo heat-robbing evaporation and cracking after top dead center (ATDC) to produce thermal ions that stimulate combustion from a multitude of stratified charge sites which may achieve subsonic flame speeds.

The present embodiment provides injection delivery according to the electrode nozzle design, Lorentz thrusting, and/or Corona ionization to customize subsonic, sonic, or supersonic injection velocities of multitudes of electrically induced and controlled stratified charge combustants including activated oxidant and/or fuel particles. This adaptive utilization of electrically produced and controlled ion driven ignition may reduce back work by mechanical diesel fuel pumps and can readily match or improve on the previous diesel operation's thermal stratification of combustion. Because of much greater control of the production and presentation of electrically produced ions and/or ion thrusting some embodiments can produce subsonic, sonic or supersonic combustion speeds according to adaptive controls at idle, acceleration, cruise and full power modes of operation to improve power and performance with greatly reduced emissions while achieving higher thermal efficiency and fuel economy with much less expensive fuels such as natural gas and hydrogen or methane from sewage, garbage, agricultural, and industrial wastes including various metal and chemical substances.

Fuel injector and igniter 585 provides injection and/or ignition of fuels selected and delivered from tanks 535, 560A or separator 571A or alternatively from tank 524 through selector valve 536 or through selector valve 538 from tank 526. Thus, injection of fuel from tank 526 can be controlled by one or more fuel control valve openings with or without electrical production of ions. Characterization of fuel stratification and improved component durability by injection of hydrogen at TDC or ATDC is achieved regardless of piston speed, combustion chamber geometry, swirl, and other gas dynamics. Hydrogen injection at or after TDC can be controlled by one or more fuel control valve openings with or without Lorentz thrusting, and such hydrogen and/or hydrogen ions may be injected through the electrode nozzle to maintain and/or clean away any deposits. Such hydrogen injection may include one or more Lorentz thrusting of selected portions of the hydrogen being injected, and can be with or without Corona discharge to produce additional ignition ions in the penetration patterns of stratified hydrogen and/or other fuel species. Furthermore, hydrogen injected ATDC at sufficient temperatures (e.g., 100 to 500° C.) sets up an energized ion pattern that is conducive to corona discharge ignition. This thermal pilot effect can be complementary or reduce or eliminate the need for Lorentz thrusting of hydrogen ions to facilitate corona discharge. As a result a simplified ignition circuit and/or lower electrical energy expenditure can be used, as compared to a higher-power combination Lorentz-Corona ignition circuit. Thus, the corona pattern may be manipulated by the penetration pattern of the heated hydrogen. The penetration pattern of the hydrogen may be aimed or steered into the combustion chamber with deflectors and/or swirl channels (see e.g., FIG. 13A) or with pattern spread.

Figure 2A:
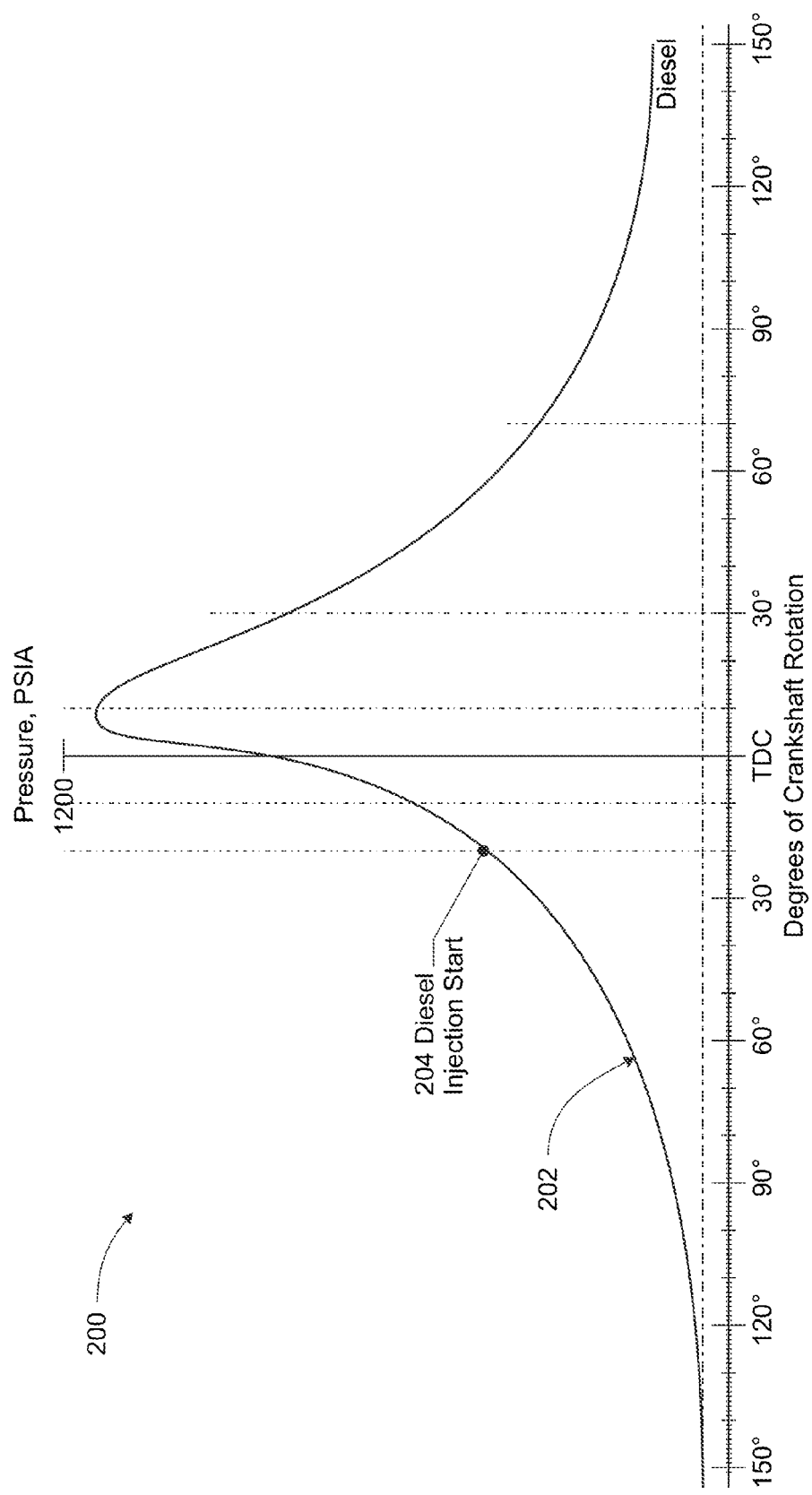
FIG. 2A is a chart depicting a pressure trace for a conventional diesel combustion cycle.

FIG. 2A shows a pressure chart 200 for a conventional diesel engine illustrating crank-shaft angle versus pressure. Pressure trace 202 is produced by compression ignition of diesel fuel injected into the combustion chamber of an engine, starting at 204 (i.e. 20° BTDC).

Figure 2B:
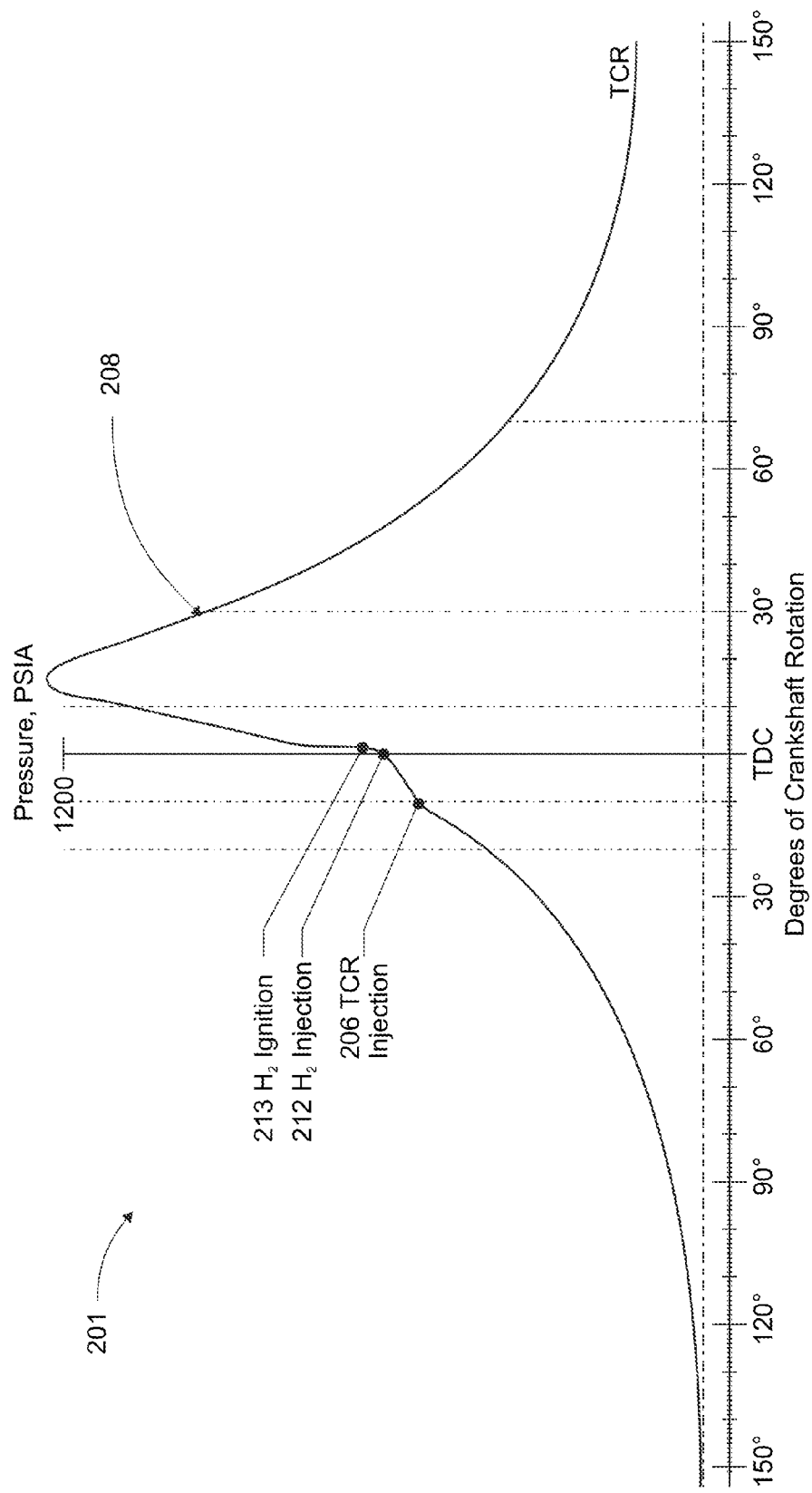
FIG. 2B is a chart depicting a pressure trace of an engine cycle according to the technology of the present disclosure.

FIG. 2B shows a pressure chart 201 for the combustion chamber event initially cooled with a positive coefficient Joule-Thomson fluid such as TCR produced carbon monoxide (CO) and thereafter heated with a negative coefficient Joule-Thomson fluid such as hydrogen ($H_2$). In an exemplary application, the positive coefficient Joule-Thomson such as a fluid from cool or cryogenic storage (e.g. LNG) and/or a TCR fluid such as carbon monoxide is injected at 206 (10° BTDC) in order to produce expansive cooling of the charge in the combustion chamber. This cooling reduces the engine's back work before TDC. In some embodiments the positive coefficient J-T fluid is expanded into the combustion chamber at a pressure of between about 100 psi and about 1000 psi greater than the pressure inside the combustion chamber and at a crank angle of between about 5° and about 20° BTDC. In an embodiment, the positive coefficient Joule-Thomson fluid can be comprised of a fuel from a pipeline or storage container, or TCR constituents, such as natural gas or liquid petroleum "LP" fluids (e.g. methane), ammonia, or CO, as explained above. In certain embodiments, the positive coefficient Joule-Thomson fluid can be supplied from tank 535 and/or 526 as explained with reference to FIGS. 5A and 5B.

With continued reference to pressure trace 208, a negative Joule-Thomson fluid (e.g., hydrogen) is injected starting at 212 (e.g. TDC) or thereafter in order to cause expansive heating and thereby produce higher BMEP compared to compression ignition operation with equal chemical fuel potential energy as diesel fuel. In some embodiments, one or multiple injections of the negative J-T fluid is expanded into the combustion chamber within a suitable interval such as corresponding to crank angles between about 0° and 60° ATDC. In an embodiment, hydrogen can come from storage 524 in FIG. 5B or 533 or 550 in FIG. 5C or on-board production by hydrogen generator 600 (FIG. 6) or 800 (FIG. 8A). In other embodiments, the negative J-T fluid can comprise a mixture of hydrogen and helium and/or neon. In an illustrative embodiment the expansive heating increases cylinder pressure from 212 to 213 (1.5° ATDC) at which point the mixture is ignited to considerably increase the useful pressure and net work.

Figure 2C:
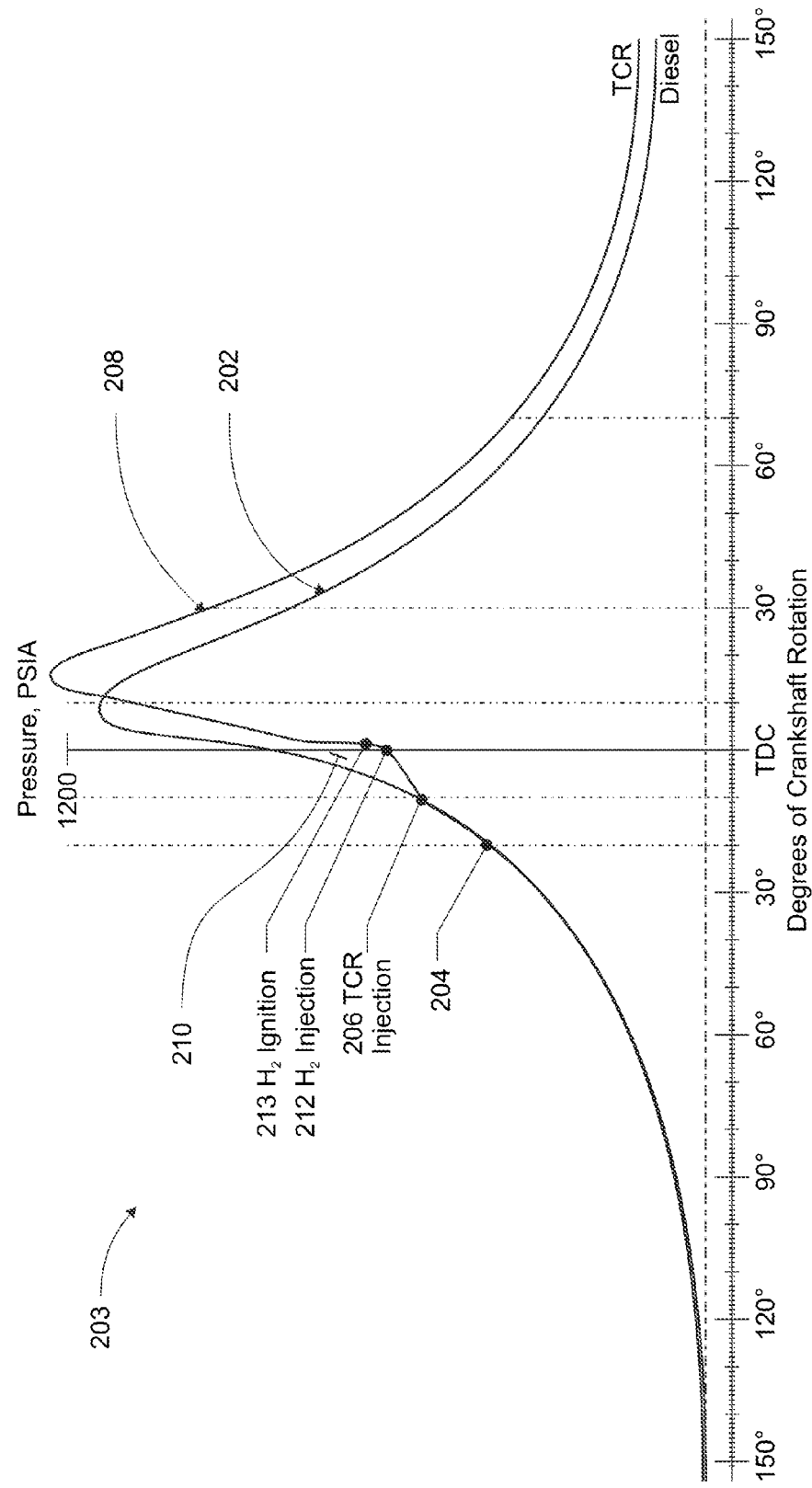
FIG. 2C is a chart depicting a comparison of the pressure traces shown in FIGS. 2A and 2B.

FIG. 2C shows chart 203 which overlays pressure traces 202 and 208 in order to illustrate the differences in cylinder pressure between conventional diesel operation (trace 202) compared with an embodiment of the present disclosure (trace 208). The area before TDC under the pressure trace 202 for diesel is considerably greater than the area under pressure trace 208 for the Joule-Thomson expansion cooling case. The difference in area under the two traces (202, 208) between point 206 and TDC, indicated by reference number 210, represents the reduction in back work achieved by using the disclosed cycle. In addition, as shown in the FIG. 2C, the injection of the same amount of chemical potential energy including a negative coefficient Joule-Thomson fluid at or after TDC may result in a peak cylinder pressure higher and greater amount of torque and work production than the same amount of chemical energy injected according to the conventional diesel case.

Figure 3A:
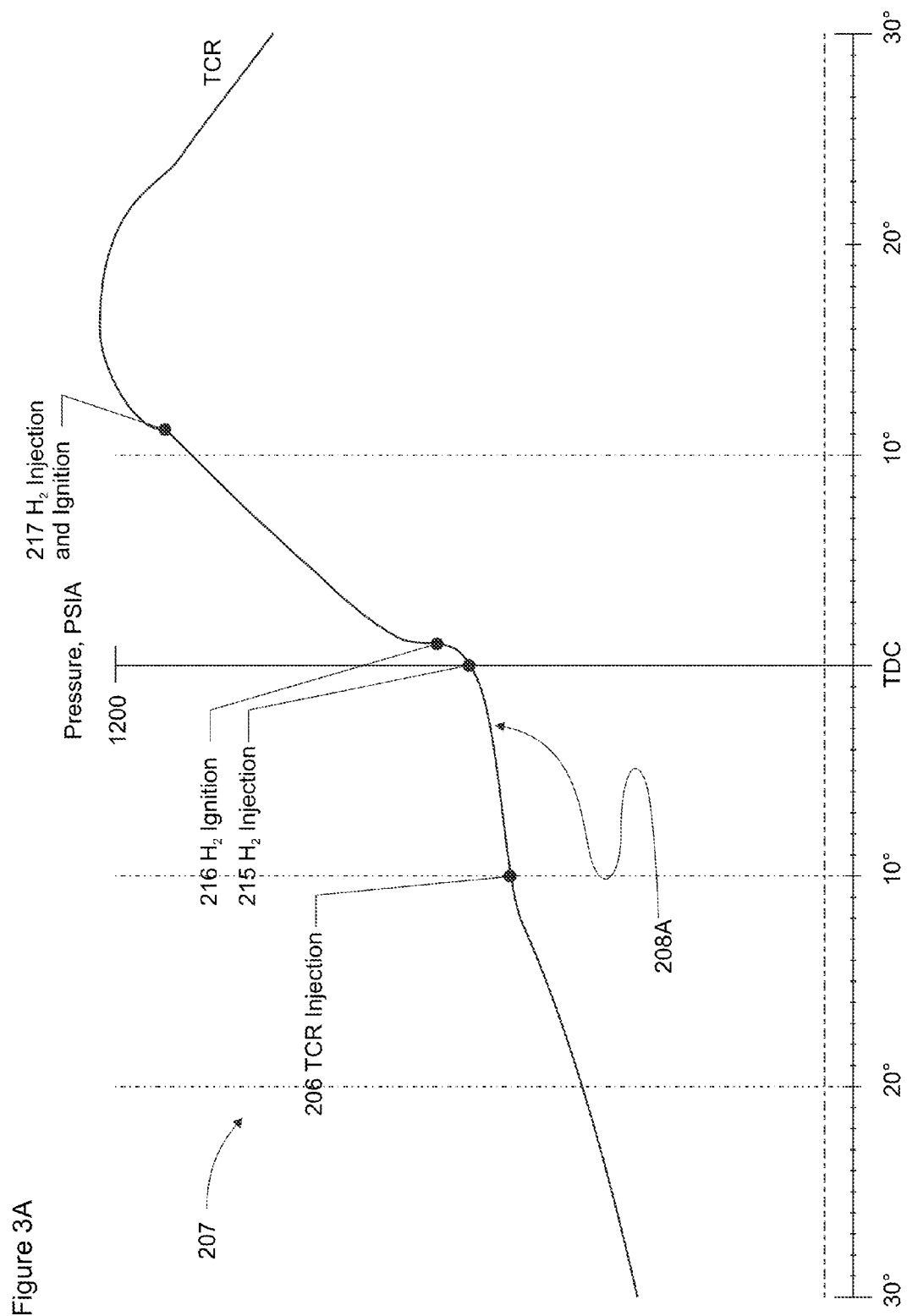
FIGS. 3A-3B illustrate details of selected pressure trace curves with injection and ignition events.
Figure 3B:
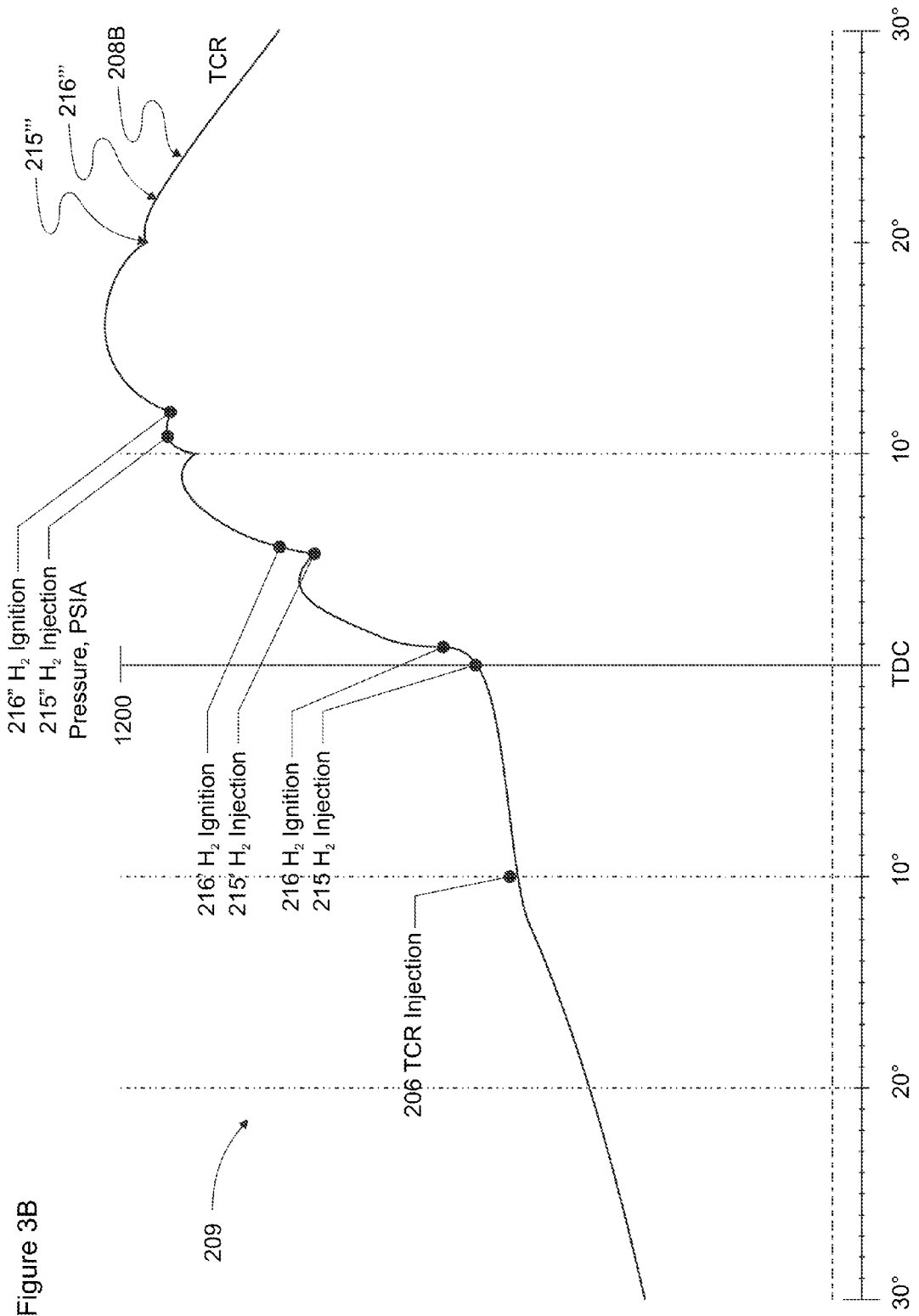

FIGS. 3A and 3B illustrate magnified details of pressure traces having multiple injection and ignition events. For example, pressure chart 207 (FIG. 3A) illustrates pressure trace 208A, which is similar to pressure trace 208 in FIG. 2B, with the addition of a subsequent injection and ignition event 217. Accordingly, pressure trace 208A includes injection of a positive coefficient Joule-Thomson fluid (e.g., TCR) at 206 (10° BTDC). Trace 208A also includes injection of a negative coefficient Joule-Thomson fluid at 215 (TDC) with ignition 216 thereafter. In addition, pressure trace 208A includes a subsequent simultaneous injection and ignition event 217 (11° ATDC). Subsequent event 217 includes injection of a negative coefficient Joule-Thomson fluid, such as hydrogen. As shown in FIG. 3B, pressure chart 209 illustrates pressure trace 208B, which is similar to pressure trace 208 in FIG. 2B, with the addition of multiple subsequent injection and ignition events (e.g. 215', 216', 215", 216"). Accordingly, pressure trace 208B includes injection of a positive coefficient Joule-Thomson fluid (e.g., TCR substances) at 206 (10° BTDC). Trace 208B also includes primary injection and injection and ignition events 215, 216. Specifically, injection of a negative coefficient Joule-Thomson fluid at 215 (TDC) with ignition 216 thereafter. In addition, pressure trace 208B includes subsequent secondary and tertiary or more injection and ignition events. The secondary injection and ignition events occur at 215' (5° ATDC) and 216' (5.5° ATDC), respectively. Subsequent injection and ignition events occur at 215" (11° ATDC) and 216" (12° ATDC), respectively. Injection events 215' and 215" each includes injection of a negative coefficient Joule-Thomson fluid, such as hydrogen. Subsequent fuel injection and ignition events 215''' and 216''' may be made to provide required torque and/or power production performance as shown. While the disclosed exemplary embodiments recite specific representative crank angle timing, this crank angle timing is approximate and many other suitable injection and ignition timing events can be used.

Figure 4A:
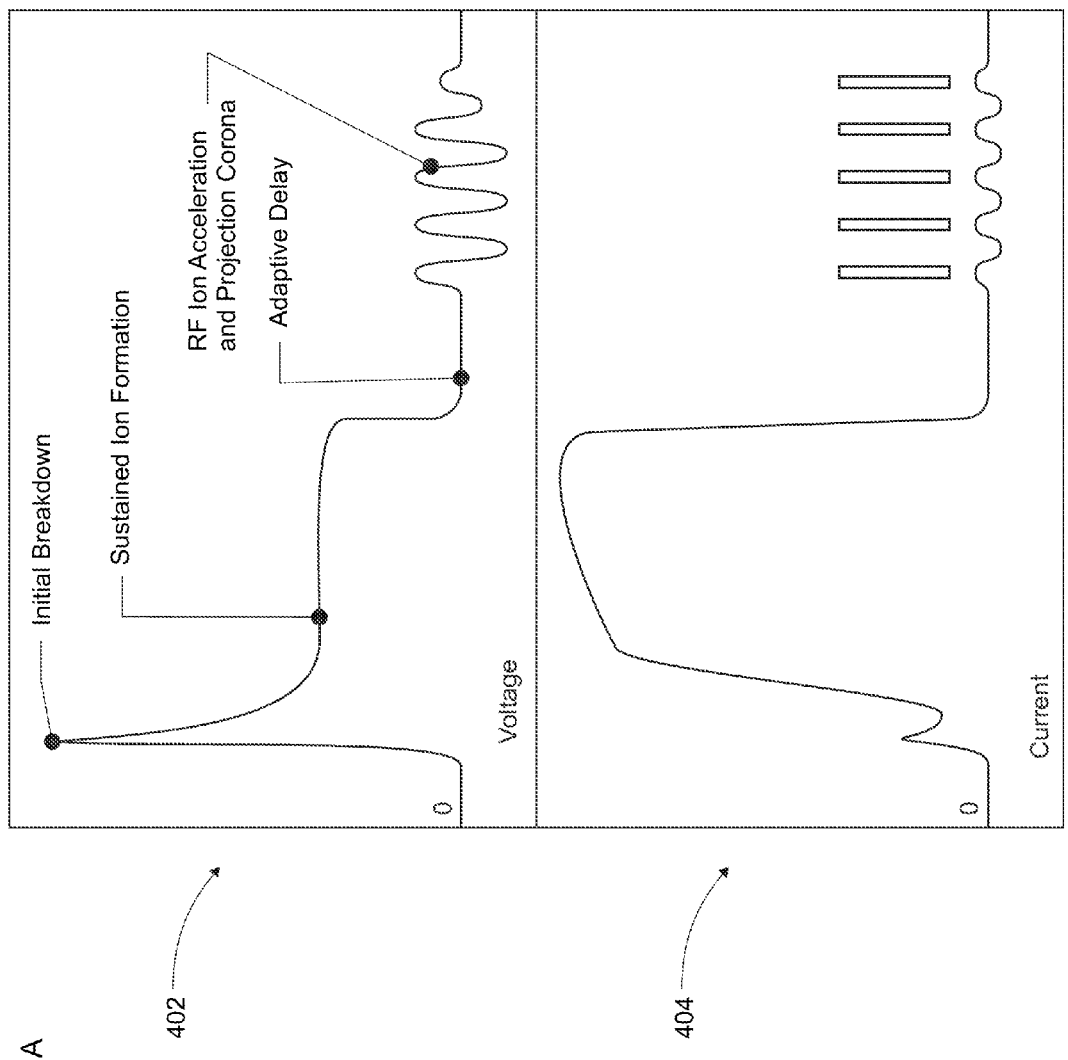
FIGS. 4A-4B illustrate details of adaptively timed ignition and ion thrusting by Lorentz thrusting, followed by the option of utilizing a corona discharge ignition.
Figure 4B:
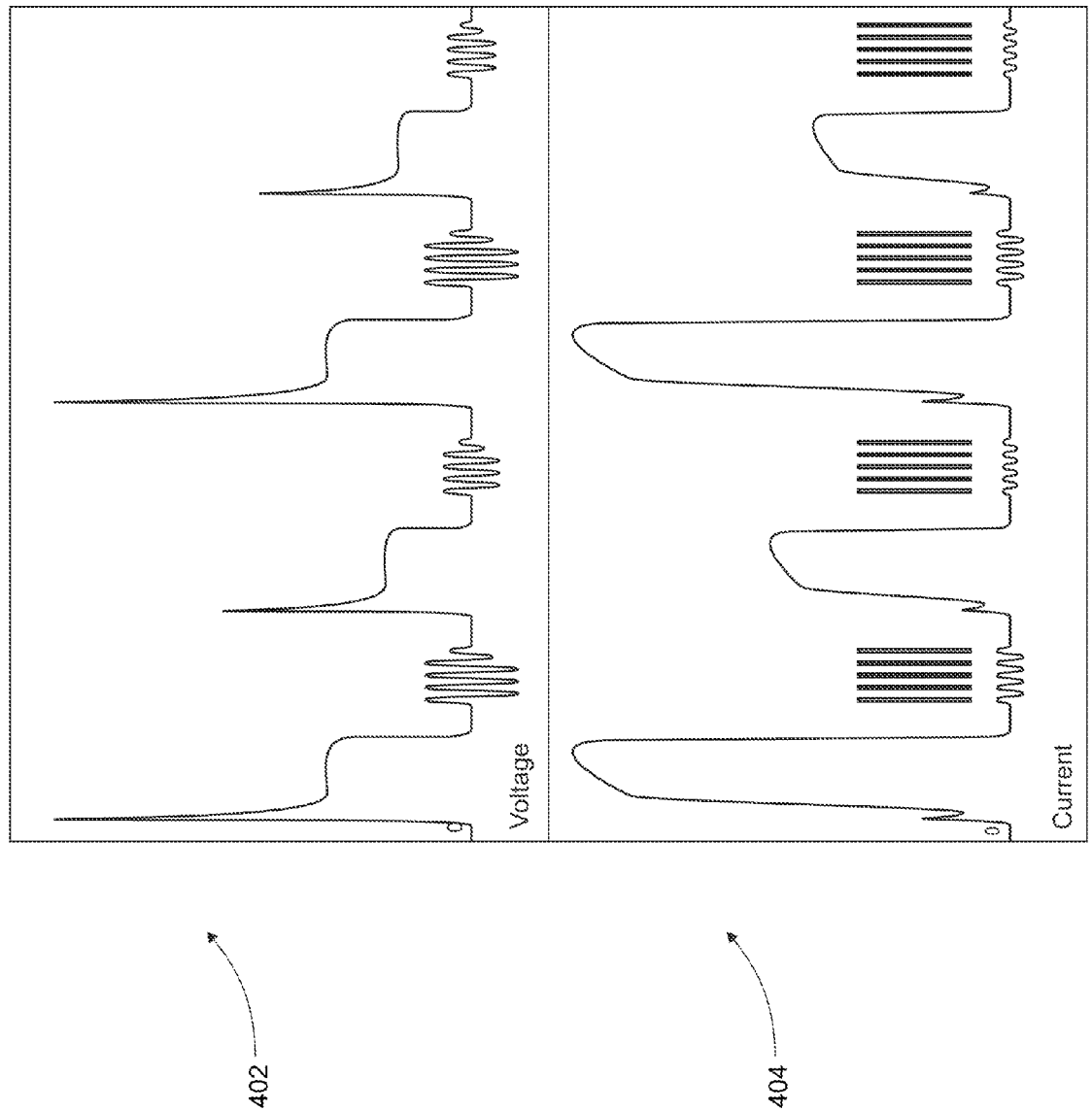

FIGS. 4A and 4B illustrate details of adaptively timed ignition and ion thrusting by Lorentz thrusting followed by the option of utilizing piloted corona discharge ignition within the stratified charge of the fuel injection pattern. As shown in FIG. 4A, ignition voltage trace 402, an electric field potential is provided to initially produce a small current of ionized particles as shown in trace 404. Upon development of the small ion current, the electrical resistance drops precipitously and continued application of an adaptively selected voltage-time profile even including greatly reduced voltage can produce a growing current with an expanding ion population and resulting Lorentz thrust force to provide the desired launch velocity, population and pattern of ions along with other swept particles. The same process steps provide Lorentz thrusting of oxidant ions and/or fuel ions into the combustion chamber and may be sequenced to launch oxidant ions that are overtaken by launched fuel ions traveling at a higher velocity.

Control of the applied voltage and thus the current as a function of the time during which ions are traveling toward the combustion chamber enables control of the exit velocity, population and penetration pattern of ions that are thrust into the combustion chamber. The exit velocity and penetration pattern of ions can be adaptively controlled by a system that monitors and responds to feedback sensors located in or near the combustion chamber. Variation of this ion current development profile provides control of ignition, air-utilization, combustion and stratified heat generation and work production at idle, acceleration, cruise and full power modes of operation. The magnetic field strength "B" that is established by this current multiplied by the current magnitude (I) is proportional to the Lorentz force that is exerted on the adaptively controlled growing current of ions. Equation 3 shows this proportional thrust force (F) relationship at any given instant.

$$F=(B)(I) \qquad \text{Equation 3}$$

Because the mass and inertia of these oxidant and/or fuel ions is very small and the current can be quickly controlled, the acceleration produced by such Lorentz force is sufficient to produce low, medium or high launch velocities of ignition ions that are thrust into the stratified or variously mixed charge of fuel previously injected from a suitable source such as tank 526. Launch velocities of multitudes of such ions can be controlled from subsonic to supersonic velocities to develop air utilization patterns of stratified heat generation and much greater fuel economy and performance including operation at full power, cruise, acceleration, and idle modes.

Exemplary FIG. 4B shows multiburst combinations of Lorentz ions and corona discharges that may be piloted to occur in the patterns of Lorentz thrust ions. Such combinations can provide control of the location of stratified heat generation while reducing the amount of electrical energy for desired combustion outcomes such as accelerated ignition and completion of combustion. Embodiment systems that provide such acceleration of ignition and completion of combustion may enable one or more bursts of fuel to be delivered after TDC and combustion to be completed at crank angles that produce torque more efficiently than conventional operating systems.

Figure 5C:
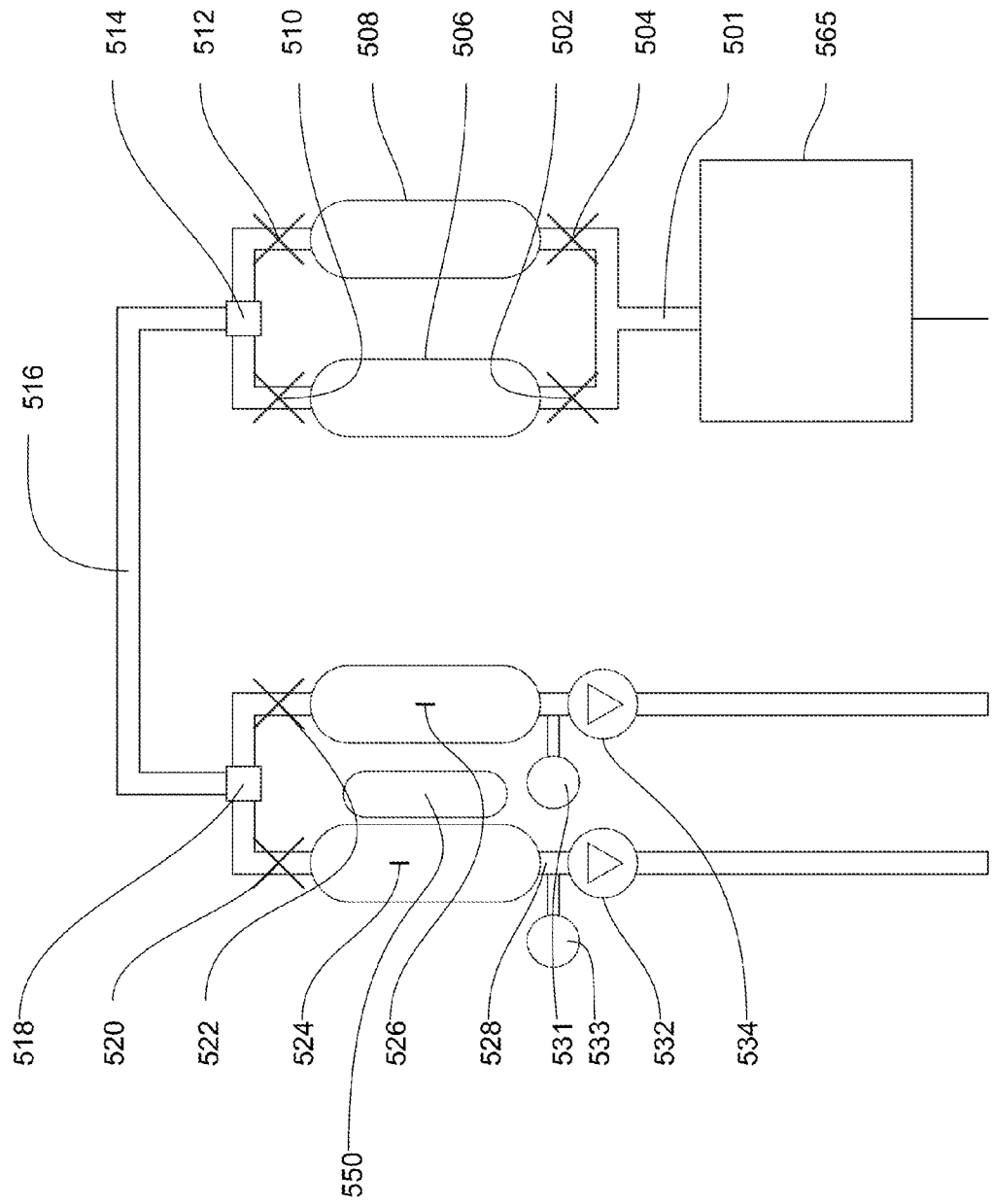

FIG. 5C shows another system embodiment for production and fuel injection of separated TCR gases. This embodiment is similar to that shown in FIG. 5B and further includes accumulators 531, 533, and tank 550. This embodiment provides carbon production from hydrocarbon feed stocks by endothermic dissociation of one or more selected feed stocks such as methane, ethane, propane or natural gas to co-produce hydrogen as provided by a suitable sub-system such as reactor 580. Hydrogen along with partially dissociated or un-dissociated feed stock substances are stored in vessel 565. Hydrogen is separated from other fluids stored in vessel 565 by suitable filtration, pressure or temperature swing sorption, ion production and transport through semipermeable membrane, or by phase changes in processes provided by coordinated operation of valves 502, 504, 510, 512, 514, 518, 520, and 522 from time to-time to process gases transferred from vessels 506 and 508. Substantially separated hydrogen is then transferred to vessel 524 and may be further pressurized and/or stored in accumulator 533 and/or 550 (e.g. for surplus production and storage to benefit regenerative energy conversion efficiency) by one or a combination of events such as may be provided by adsorptive collection and/or hydride production by media contained in pressure vessel 524 and increased pressure production upon endothermic release and/or by pump 532. Gases remaining from such hydrogen separation processes are stored in vessel 526 and may be similarly pressurized including storage in accumulator 531 and/or pressurization by pump 534. Pressurized gases from tank 526 such as methane, ethane, propane etc., and/or other fluids that produce positive Joule-Thomson expansive cooling are injected by a suitable device such as embodiment 585 into combustion chamber 579 of engine 581 to reduce the pressure and thus reduce back work 210 compared to diesel engine operations pressure trace 202 in the compression stroke of engine operation as shown by pressure trace 208 in FIG. 2C. Subsequently pressurized hydrogen is injected one or more times by suitable component such as embodiment 585 at and/or after TDC to produce negative J-T expansive heating and/or accelerated ion ignition of such hydrogen along with fuel injected before TDC to provide greater net-work output of engine 581 than provided by compression ignition and combustion of diesel fuel with equal chemical potential energy.

Stratified charge diesel fuel combustion in compression-ignition engines may produce maximum cylinder pressure at about 15-17 degrees ATDC in efforts to avoid earlier detonation but hopefully assure that most of the diesel fuel undergoes combustion and that adequate torque is produced by development of such pressure at crank angles with adequate torque arms. In an embodiment, the disclosed technology provides the ability to produce greater combustion pressure and torque with hydrogen and/or other fuel constituents such as methane, carbon monoxide, propane, or various fuel alcohols at the same crank angle as diesel operation or at greater crank angles in the range of about 15 to 100 degrees ATDC or higher to benefit torque production at greater crank arm values. In addition, some embodiments enable Lorentz thrusting of oxidant and/or fuel ions along with other swept particles and accelerated initiation and completion of combustion of one or more fuel injections to produce torque at one or more crank angles to greatly improve fuel efficiency and performance without the conventional limits such as the compression ignition limitation of peak pressure at 15-17 degrees ATDC.

The multi-burst injection and combustion regime shown in FIGS. 3A and 3B can be extended through greater crank angles ATDC with additional injection, ignition and combustion events as depicted in FIGS. 3A, 3B, and 4B to shift the pressure production events as desired for greatly improving the net work accomplished per unit of fuel pressure and chemical potential energy. This advantage is enabled because of the much more favorable timing such as adaptive control of J-T expansive cooling and/or heating along with ion thrust injection and corona ion ignition to minimize back work and accelerate one or more beginnings and completion of combustion. Multiple injections, particularly including thermochemically pressurized hydrogen-characterized expansive heating and ion ignition at multiple penetration distances and patterns provide far greater air-utilization efficiency along with greater torque per chemical fuel potential energy unit in comparison with diesel fuel and compression ignition.

Positive ignition by electrical ions produced by Lorentz thrust patterns and/or corona discharge provides greatly improved torque development compared to diesel fuel combustion limitations including compression ignition by thermal ions. Multi-bursts of electrically induced ions at multiple penetration distances and patterns can beneficially utilize controlled patterns of accelerated burn zones or controlled detonations (e.g. at selected combustion chamber locations after TDC) to further improve the torque per heating value of directly injected fuels. Benefits include development of a much wider range of crank-shaft angles with adaptive torque production to meet varying load conditions along with greater fuel efficiency.

Positive ignition by such electrical ions also enables a much greater range of fuel-air ratios in fuel injection and mixing patterns. Illustratively, an engine could be operated with methane, ethane, propane, and/or natural gas injection and expansive cooling to reduce back work during compression with or without subsequent ignition of the positive J-T expansion substance followed by hydrogen injection at selected piston positions at or after TDC to produce heating and to facilitate rapid and clean acceleration and/or completion of combustion that is stimulated and/or accelerated by one or more stratified hydrogen injection patterns and/or further Lorentz and/or corona ignitions at selected piston positions.

Such operations provide an large range of single and multi-burst combinations of expansive cooling injection timing to reduce back work followed by single and multi-burst expansive heating at or after TDC along with further sub-dividing Lorentz multi-burst and/or corona discharge ignitions such as shown in FIGS. 3B and 4B to produce combustion chamber pressure profiles and overcome limitations of diesel fuel characteristics and compression ignition including objectionable emissions, higher fuel expense, and compromised thermal efficiency.

Various materials and metals such as industrial wastes, including substances such as sodium, potassium, magnesium, calcium, aluminum, iron, carbon and silicon, can be presented and/or activated to replace hydrogen in water. Equation 4 generally shows the representative process whereby such substances are depicted individually or as alloys or composites "M" in reactions to replace hydrogen in water or steam to produce hydrogen and an oxide and/or one or more hydroxides of the "M" substances.

$$M + H_2O \rightarrow MO + H_2 + HEAT \qquad \text{Equation 4}$$

FIG. 6 illustrates a hydrogen generator 600, according to a representative embodiment, that is operative to supply heat and hydrogen for various applications, such as engines and production processes. In this application of an illustrative process of Equation 4, hydrogen generator 600 provides efficient conversion of waste M-materials such as aluminum to chemical and pressure fuel potential energy by: useful application of scrap aluminum food and beverage cans along with metal chips from machine shops and various other wastes including aluminum packaging products such as aluminized paper and polymer films; local job development for production of more valuable new products compared to ordinary recycling of aluminum; generating hydrogen from water and aluminum along with refined $Al_2O_3$ for use as abrasive and polishing media, and/or Al(OH)₃ for applications in numerous new products (particularly valuable products include sapphire crystal profiles, shapes, and photo-electronic devices).

In operation, a feed stock in a suitable form such as chips, shreds, strip, wire, wool, or bar stock 606 is fed through a pressure seal 604 into one or more traction and activation pinch rollers such as 608, 612, and/or 614 that may be individually or synchronously powered by a power take off from an engine or by a suitable hydraulic, electric or pneumatic motor, or by a hand crank (not shown). This provides increased velocity of travel of the high surface to volume formed thin strip or foil of aluminum 620 that may be corrugated and/or perforated by suitable forming and/or distressing rolls 612 and/or 614 to provide clean extended surface activation. The aluminum foil 620 is presented as a stressed and/or curled high surface-to-volume foil to steam that is produced by exothermic reaction heating of water that is supplied through fitting 622 to annular distributor 624 and injection ports such as 626.

The hydrogen generator 600 can produce high pressure hydrogen, which is the product of intermittent cycles in which low pressure water is loaded and converted to high pressure hydrogen and/or by continuous delivery of high pressure water that is added through fitting 622. As a result of the exothermic reaction with aluminum, gaseous steam and hydrogen products are produced that occupy much greater volume than the liquid water and solid aluminum, and further, as a result of the greater number of moles of gaseous hydrogen per mole of solid aluminum consumed as shown in Equation 5.

$$Al + 3H_2O \rightarrow Al(OH)_3 + 1.5H_2 + HEAT \quad \text{Equation 5}$$

Hydrogen thus produced is filtered and advantageously removed by suitable filter media 618F such as hydrophobic graphite foam, carbon, ceramic, or metal fibers compacted into a body with collection passageways such as a helical annular groove or channel 618G on the outside diameter to feed filtered hydrogen to fitting 616 for delivery to applications utilizing the generated hydrogen.

An embodiment that provides very fast start up includes a suitable heating element such as 634, a portion of which is shown in FIG. 6 and/or heat that is transferred from the cooling system or exhaust gases of an engine, for example. This provides rapid heating of media 632 and/or steam in the upper reaction zone to 100° C. (212° F.) or higher for quickly enabling rapid production of pressurized hydrogen. After reaching suitable reaction rate, heat transfers such as may be supplied by heater 634 are shut off as the reaction is exothermic and autogenously continues to produce pressurized hydrogen and heat as summarized by Equation 5.

In some embodiments, filter media 618F is catalytic in order to reduce the activation energy of the reaction shown in Equation 5. Catalysts for this purpose may be general for a wide variety of agents and derivatives of feedstock substances. In other embodiments, the catalyst may be specific as illustrated by suitably activated carbon that is coated on aluminum wire 606 or wool or powder and distributed on filter media 618F by wiping of contact surfaces as foil 620 travels along the filter body. Any form of M-substance such as aluminum, including foil not promptly reacted as provided in Equation 5, is subsequently reacted in hot caustic 632 such as NaOH and/or KOH which serves as another process catalyst in various enablements such as to soften any film of aluminum oxide or aluminum hydroxide on foil 620 which is aided by the exfoliating stress on such films that may result including curling and or bending of foil 620 to thus promote the release of hydrogen at the pressure maintained by addition of water through fitting 622 and/or feed stock aluminum 606.

Control of the amount of hydrogen and heat produced is provided by control of the rate that water is added through fitting 622 and/or the rate that reactant such as magnesium and/or aluminum such as foil 620 is added to the gaseous and/or liquid reaction zones shown, and/or by control of the rate that exothermic heat produced by the process summarized by Equation 5 is removed or otherwise dissipated.

The hydrogen can initially be produced from waste M-materials such as aluminum such as cans, machine shop cuttings, etc., and caustic solutions such as can be made from a supply of dry Drano® or NaOH Lye and/or from KOH and/or from water and wood ashes. The consumable water for this purpose can include water contaminated with brackish or ocean water, sewage or other disaster debris. Hydrogen generator 600 enables many types and sizes of engine generators to be converted to heated and/or pressurized hydrogen for a fuel cell or an external or internal combustion engine (ICE) operation to produce full power, provide exhaust steam suitable to heat a surgery support autoclave, and provide steam for domestic purposes such as heating a cook top, oven, clothes dryer and space heater. The steam can be further utilized and condensed in a heat exchanger that heats filtered water to sterilizing temperatures for washing dishes, bedding, and clothes. Thereafter, the steam can provide nine kilograms of pure water per kilogram of hydrogen consumed.

Figure 7A:
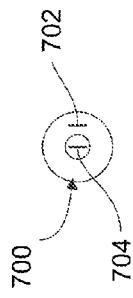
FIG. 7A is a schematic cross-sectional representation of sheath material and core material according to a representative embodiment.
Figure 7B:
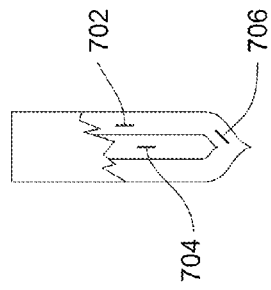
FIG. 7B is a schematic partial cut-away of a longitudinal section of the sheath material shown in FIG. 7A.

Another representative embodiment that may be enabling of rescue and emergency support is to prepackage coils of a relatively stable metal such as steel, magnesium or aluminum as a composite wire or strip. FIG. 7A shows a cross section of wire 700 in a coil of material with sheath material 702 and core material 704. FIG. 7B shows a partial cut away of a longitudinal section of the sheath closure and hermetic seal 706.

Illustratively, a steel or aluminum composite provides a protective sheath for core materials such as sodium, potassium, magnesium, calcium, carbon and/or suitable hydrides. The ends of such coils can be pinched, welded or otherwise sealed to provide long shelf-life and upon activation by the hydrogen generator 600 of FIG. 6 produces hydrogen of the desired pressure to start and run an engine, for example. In operation with such core substances that include sodium and/or potassium, the inventory of catalyst medium 632 can be produced or maintained and allow for losses such as incorporation with pressurized extrusion of the metal hydroxide produced such as aluminum hydroxide that may occasionally be removed through conduit 638 and valve 636.

During operation, accumulated aluminum and/or other metal hydroxides is occasionally pressure extruded through a suitably located valve, such as valve 636 which may be fed by a stratification pickup tube 638. The slurry extrudate may entrain portions of catalyst liquid 632. Catalyst 632 replenishment can be provided by utilization of a selected length of embodiment 700 to provide NaOH and/or KOH as a result of reaction of water with the sodium and/or potassium content of the core material.

Another embodiment of feed stock 606 is a composite of powdered magnesium or aluminum sheath material 702 that is held together with suitable organic or inorganic binder to form a protective sheath around a carbon film or foil that seals a core substance such as ionic, covalent, or interstitial hydride and/or a suitable substrate such as a graphene and/or nano-particle matrix with adsorbed hydrogen. Embodiments that provide rapid startup include core materials such as sodium, potassium, calcium, and/or hydrides such as sodium hydride, calcium di-hydride, or boron tetra-hydride, all of which readily react with ambient temperature water to release hydrogen and considerable heat.

Upon heating the catalytic sodium and/or potassium hydroxide 632, the reaction of aluminum proceeds at a high rate of continued hydrogen production and additional heat is released. Upon reaching a sufficiently high temperature the carbon reacts with the steam, releasing carbon monoxide and/or carbon dioxide. Thus, depending upon the desired gas delivery from fitting 616, hydrogen generator 600 can be controlled with operating temperature to control the amount and type of pressurized gas supplied from fitting 616. Rate control including quick shut down is provided by control of the rate that water is added through fitting 622 and/or the rate that reactant 632 is fed into hydrogen generator 600 and/or the temperature of operation as a function of the heat removal rate from the assembly.

Figure 8B:
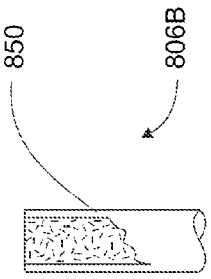
FIG. 8B is a schematic partial cut-away of a reaction feed stock embodiment having a relatively thin-walled tube.
Figure 8A:
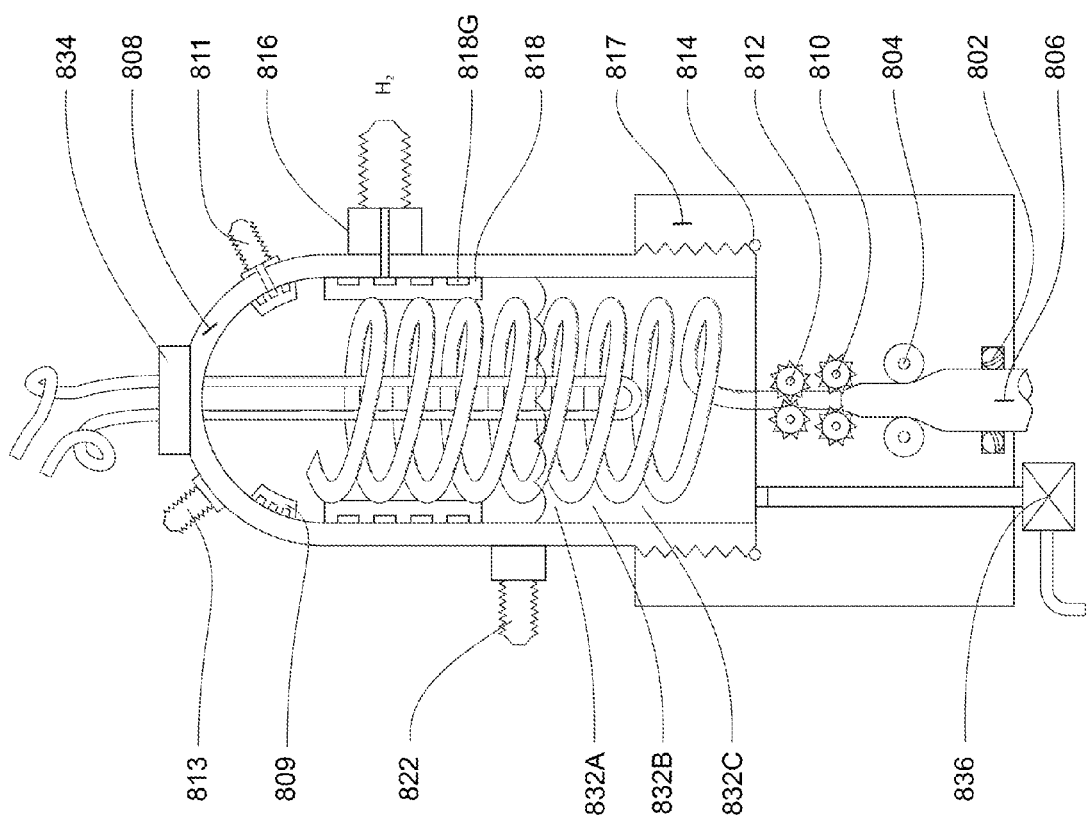
FIG. 8A is a schematic cross-sectional representation of a feed stock reactor for hydrogen generation according to a representative embodiment.

FIG. 8A shows hydrogen generator 800 for reaction of feed stock 806, such as embodiments 806B shown in FIG. 8B that may incorporate or be mixtures of and/or contain carbon, calcium carbide, steel, cast iron, aluminum, magnesium, and/or a suitable metal hydride reactant. Feed stock 806 is fed from the bottom of hydrogen generator 800 past seal 802 such as pressurized gland or an O-ring or "V" pack by a suitable thrust actuator, such as one or more pinch rolls 804 or gears 810 or perforating and/or surface texturing or distressing stages 812 into zone 832C of pressure chamber 808. One embodiment provides for producing stresses that flatten and/or curl the material being thrust into zones 832C and/or 832B and sometimes beyond.

In zone 832C material 806 is intimately exposed to heated water, steam, and/or catalytic agents such as activated carbon, sodium hydroxide and/or potassium hydroxide. Zone 832C may also include precipitates such as oxides or hydroxides of metals such as iron, aluminum, magnesium, calcium, etc., that are produced by reactions with steam to produce hydrogen that is removed through fitting 816 after filtration through suitable filter media 818 such as activated carbon, carbon foam, or fiber or wire compact. Collection of filtered hydrogen may be aided by slots or passageways such as spiral/helical passageways 818G. Pressurized water is added through fitting 822 at a rate that controls reactions to release and pressurize hydrogen to the magnitude desired such as 100 to 1,000 BARG.

Although the reactions to produce hydrogen may be exothermic, initial heating to expedite hydrogen production may be added by electrically induced plasma and/or resistance or inductance heater 834 as shown. Reaction products that collect in zone 832C are removed by pressure extrusion through valve 836 for applications including recycling to produce feed stock 806.

Equations 6 and 7 summarize processes that are useful for emergency production of pressurized hydrogen from acid such as waste sulfuric acid (i.e. from lead-acid batteries) and scrap steel, zinc, aluminum, or magnesium.

$$Fe + H_2SO_4 \rightarrow FeSO_4 + H_2 + HEAT \quad \text{Equation 6}$$

$$Mg + H_2SO_4 \rightarrow MgSO_4 + H_2 + HEAT \quad \text{Equation 7}$$

In operation with a reactor, such as shown in FIG. 6 or 8A, dilute sulfuric acid is fed through port 622 or 822 by a suitable pump, and scrap metal, including mixtures of metals such as steel, zinc, aluminum, and/or magnesium, is fed into the reactor in the form of rolled or crushed wire 606, 806, resulting in the delivery of hydrogen from fitting 616 or 816 as shown. Hydrogen can be produced at high pressure by intermittent loading of low pressure sulfuric acid or by continuous loading by a suitable pump. Hydrogen production can be initiated or aided by carbon and/or other catalysts for reactions such as such as represented by Equations 5, 6, 7, and the like. After initiation of such reactions by catalysts and/or heat addition, controlled process heat retention provides elevated temperature operation. At elevated temperatures, sufficient activation energy is available to rapidly produce hydrogen for delivery at desired pressure. Thus, in addition to pressurized hydrogen, considerable heat can be produced by the reactions of Equations 5, 6, and/or 7 and may be transferred for efficient operation of ancillary processes including heating filtered water to provide sterilized water suitable for domestic or industrial purposes.

In applications that operation at temperatures less than about 150° C. (300° F.) is adequate, surfaces of systems shown in FIGS. 6 and 8A that are exposed to caustics or acids can be protected by polymer liners, coatings, and/or protective sleeves or tubes such as fluropolymers PTFE or PFA. Higher temperature protection from such chemical corrosion or attack is provided by selected super alloys, stainless steels such as 316 alloy, zirconium, tantalum or ceramic materials such as zirconia, spinel, alumina or tungsten carbide. Seal 814 may be a relatively soft metal such as copper, nickel or iron alloys in an O-ring, hollow-ring, or another suitable gasket profile. Such higher temperature materials of construction enable utilization of heat from the cooling system or exhaust system of an engine, for example, to maintain hydrogen generator 600 or 800 at a temperature selected to greatly accelerate hydrogen production at pressures sufficient to enable pressurization of tank 524 and/or direct injection at or after TDC as shown in FIGS. 2, 3A, and 3B. Injection pressures ranging from less than 100 to more than 1000 BARG are utilized in various engine applications.

In instances that an increased rate of reaction is desired for production of hydrogen by endothermic reaction and/or dissociation of a hydrogen donor compound such as methane, methanol, etc., or by endothermic reaction of an oxygen donor such as steam with a compound containing hydrogen and carbon, hydrogen generator 600 or 800 may be operated at an elevated temperature with feed stocks such as water and a metal and/or hydride feed stock. Alternatively for example, in an embodiment, elevated temperature fluid, such as hydrogen generator 600 to 1200° C. (1100 to 2200° F.) steam, can be produced and delivered through fitting 813 to serve as a reactant for producer gas reactions and/or heat transfer fluid for driving dissociation reactions. Hydrogen generator 800 may be constructed with a suitably insulated carbon filament wrapped zirconia or super alloy containment assembly 808, 817. Carbon filter 818 may be constructed of porous ceramic and/or superalloy or stainless steel fiber, metallic and/or graphite foam, or activated carbon in order to deliver high temperature and/or high pressure hydrogen through fitting 816. Utilization of suitable medium 832A, 832B, such as carbon catalyst particles and/or fluidized ceramic particle bed, and/or fused caustic or salt mixtures, facilitate occasional or continuous extrusion of metal oxide or metal hydroxide from zone 832C through valve 836. Feed stock water and/or other reactive substances such as fuel alcohols can be provided at the desired operating pressure through fitting 822 as shown.

Equation 8 summarizes the reaction for a mixture of water and an alcohol such as butanol, ethanol or methanol to be added through fitting 813 at the desired pressure of fuel and/or steam production in which a hydride or metal such as steel, magnesium or aluminum is another feedstock. Equation 10 summarizes an exemplary reaction of hydrocarbons such as methane in similar processes.

$$CH_3OH + 4H_2O + Al \rightarrow CO + 3.5H_2 + Al(OH)_3 + HEAT + H_2O \quad \text{Equation 8}$$

Operation may be facilitated by several types of feed stock including combinations of materials for cold start, operation at elevated temperature, and operation to produce various product selections. FIG. 8B shows a partial section view of a reaction feed stock embodiment of a relatively thin wall tube 850 made of a suitable sheath material 850 such as thermopolymer, steel, aluminum, or magnesium within which is another feed stock such as steel filings, shreds, and/or metal wool, shreds and/or powder and/or fast start up amounts of sodium or potassium or calcium carbide and/or a suitable form of metal hydride. The tube 850 provides a smooth outside diameter for sealing by one or more seals 802 against pressure produced in the reactor cavity. The selection of feed stock substances for embodiment 806B can be for very fast start up (i.e. sodium or potassium) along with slower reactants such as iron and steel alloy wastes for continued operation after the reactor reaches satisfactory temperature.

In certain embodiments, filter media 818 may be a microsieve or have hydrophobic characteristics at least on the zone providing final filtration of hydrogen to enable steam to be collected from port 813. Carbon monoxide may similarly be directed by surface active agents or another size of microsieve filter media 809 to port 811.

In other embodiments, a suitable catalyst system such as cobalt-molybdenum oxide and/or other transition metal oxides is provided to react with carbon monoxide and steam to produce additional hydrogen and carbon dioxide as summarized in Equations 9 and 10 in which a carbon and hydrogen donor such as a hydrocarbon (e.g. CxHy) is utilized.

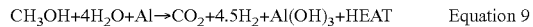

$$CH_3OH + 4H_2O + Al \rightarrow CO_2 + 4.5H_2 + Al(OH)_3 + HEAT \quad \text{Equation 9}$$

Catalyst placement on circulated zones such as filter media 809 readily provides or completes such conversion.

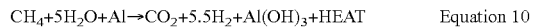

$$CH_4 + 5H_2O + Al \rightarrow CO_2 + 5.5H_2 + Al(OH)_3 + HEAT \quad \text{Equation 10}$$

Figure 10A:
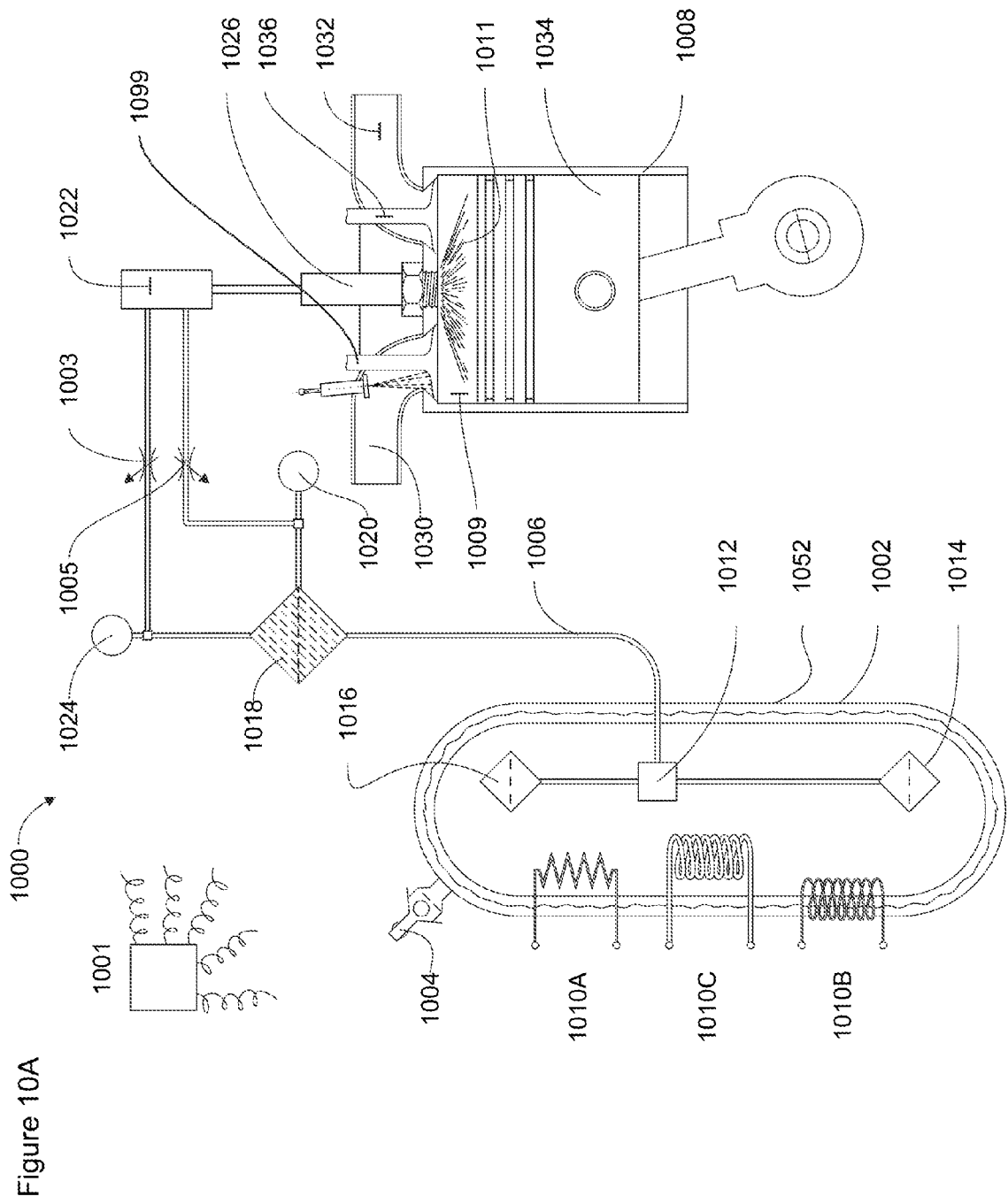
FIG. 10A illustrates a system that provides convenience for distributed energy producers and motorists, particularly small vehicle operators.

A system that provides convenience for distributed energy producers and motorists particularly including small vehicle operators is shown in FIG. 10A. An embodiment provides improved overall efficiency by utilizing the system of FIG. 5B or 5C by distributed energy producers to provide hydrogen that is combined with carbon dioxide and/or nitrogen obtained from the atmosphere or more concentrated sources such as power plants, bakeries, breweries, ethanol plants, and/or calcining plants to produce easily stored and transported liquid fuels such as ammonia and solubilized urea, butanol, formic acid, dimethylether, diethylether, ethanol or methanol. See U.S. Pat. No. 8,328,888, entitled "ENGINEERED FUEL STORAGE, RESPECIATION AND TRANSPORT," issued Dec. 11, 2012, the disclosure of which is incorporated herein by reference in its entirety. In vehicle applications, system 1000 provides an engine 1008 and a tank 1002 on board a vehicle that can interchangeably receive cryogenic methane or hydrogen liquids and/or solids, liquids such as ammonia, methanol, ethanol, butanol, and/or gaseous fuels such as methane, natural gas, hydrogen and mixtures such as producer gas including carbon monoxide, carbon dioxide, hydrogen and methane.

Methods for separation of hydrogen from mixtures containing oxides of carbon include passage or cyclic retention of such oxides through micro-filtration media such as ceramic or activated carbon. Illustratively, another embodiment may provide separation by cyclic adsorption and release or size exclusion chromatography. Membrane separation may be provided by solubility and diffusion rate differentiation along with ionization and ion transport such as through a semipermeable ceramic or proton membrane across concentration and/or electrical gradients. Hydrogen can be transported by solubility in selected media and/or through semipermeable membrane such as polymeric acids or Nafion films according to concentration gradient and/or temperature gradient and/or electrical bias.

Molecular sieves include activated carbon, porous glass, aluminosilicate zeolites, silica gel, mesoporous silica, and clays. Separation may be by size or shape in which smaller or certain shapes of molecules pass through pores but larger or other shapes of molecules are blocked. Separation may also involve surface energy differences with microporous, mesoporous, or macroporous media. Various references including "Adsorption of $CO_2$ on Molecular Sieves and Activated Carbon" provide details regarding separation of hydrogen from oxides of carbon. "Adsorption of $CO_2$ on Molecular Sieves and Activated Carbon" is incorporated herein by reference, and "Activated Carbon Adsorption," page 210 (Google books.google.com/books?isbn=0824753445) is also incorporated herein by reference.

An illustrative system operation in which tank 1002 receives through charge port 1004 fluid such as cryogenic hydrogen or methane or ambient temperature liquids such as ammonia or alcohols such as methanol or wet methanol includes the steps of: Filling or adding a liquid such as a substantial amount of methanol to tank 1002; Pressurization of tank 1002 by thermochemical respeciation by suitable heat source component 1010A, 1010B, or 1010C to convert liquid methanol and/or previously added fluid contents into gases such as $CH_3OH$, $H_2$, $H_2O$, CO and/or $CO_2$ by catalytic reaction and/or thermal dissociation using electrically induced plasma and/or resistance 1010A or induction 1010B and/or circulation of fluids 1010C from the engine's cooling or exhaust systems to supply such heat. Equations 11 and 12 summarize suitable respeciation and pressurization processes by gas phases of hydrogen and oxides of carbon that are produced from liquid phase feed stock.

$$CH_3OH + HEAT \rightarrow CO + 2H_2 \quad \text{Equation 11}$$

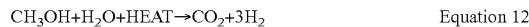

$$CH_3OH + H_2O + HEAT \rightarrow CO_2 + 3H_2 \quad \text{Equation 12}$$

In one embodiment, conveyance of pressurized gases through filter 1016, three-way valve 1012, and conduit 1006 provides separation by separator component 1018 of positive J-T expansion cooling fluids from negative J-T expansion heating fluids (e.g., $H_2$). This may be accomplished by a suitable filter 1018 such as a semipermeable membrane, activated carbon, and/or another molecular sieve to deliver positive J-T expansion cooling fluids such as oxides of carbon to accumulator 1024 and negative J-T expansion heating fluids such as hydrogen to accumulator 1020. In another embodiment, one or more injections 1011 of substances are provided from tank 1024 with positive J-T expansion cooling through three-way valve 1022 and/or injector 1026 into combustion chamber 1009 during the compression event BTDC of engine 1008 to reduce back work. In yet another embodiment, one or more injections 1011 are provided through three-way valve 1022 and/or injector 1026 of substances from tank 1020 with negative J-T expansion heating (e.g., $H_2$) during the power event of engine 1008 to increase work production.

Additional advantages are provided by certain embodiments to further improve fuel efficiency and performance by adaptive event timing and control of fluid pressures through regulators 1003 and 1005 by process controller 1001 of the pattern of penetration of positive J-T expansion cooling by one or more fluid injections BTDC during the compression event to minimize back work, adaptive timing and frequency to control one or more injection patterns of negative J-T expansion heating ATDC during the power event, and by adaptive timing of ignition by spark, Lorentz ion thrusting, and/or corona discharge.

As shown in FIG. 10A, because of the thermal gradient from compression, heated gases within cooler surrounding gas that is cooled by proximity and/or circulation along the lower temperature combustion chamber surfaces including piston 1034, cylinder walls, valves 1099 and 1036, more efficient utilization of J-T expansion cooling to reduce back work occurs by injecting BTDC such expansion cooling fluids in one or more stratified patterns 1011 that penetrate the higher temperature gas inventory.

Figure 11A:
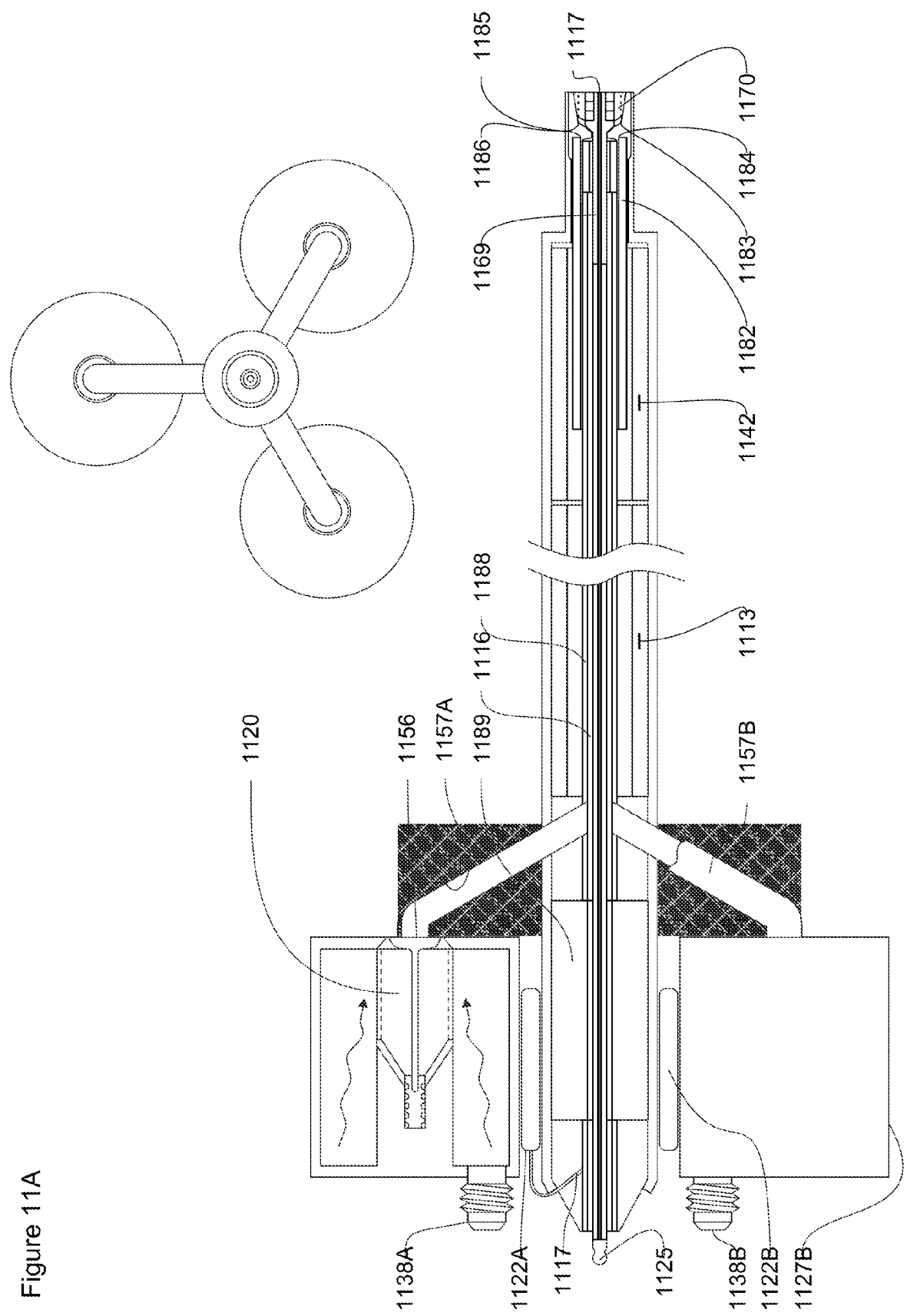
FIG. 11A illustrates an injector-igniter according to a representative embodiment for two or more fluid injection capabilities and one or more ignition options or combinations.

In certain embodiments, the functions of valve 1022 and injector 1026 are combined in an integrated injection and ignition system 1100 as shown in FIG. 11A for two or more fluid injection capabilities and one or more ignition options or combinations such as spark, Lorentz ion thrusting, and/or ignition in injected oxidant and/or fuel ion patterns. In operation, system 1100 utilizes process control computer 1122A and/or 1122B, suitable fittings for connection of port 1138A to pressure regulator 1003 (see FIG. 10A) for flow control by valve actuator 1120 (e.g., piezoelectric, magnetostrictive, hydraulic, pneumatic or electromagnetic) and valve 1156 to allow flow of positive J-T expansion cooling fluid through passageway 1157A to annular passage 1116 to provide delivery through one or more reed or expansive sleeve valves 1169 to annular passageway between electrode 1183/1186 and 1185 at adaptively controlled crank angles to reduce or benefit back work minimization.

Suitable fittings connect port 1138B to pressure regulator 1005 (e.g. FIG. 10A) for flow control by a similar suitable selection of valve actuator and control valve in 1127B to allow flow of negative J-T expansion heating fluid (e.g., H$_2$) through passageway 1157B to annular passage 1116 to provide delivery through suitable valves such as a poppet inward or outward opening or one or more reed or sleeve valves 1169 in zone 1170 of tube 1188 to annular passageway between electrode 1183/1186 and 1185 at one or more adaptively controlled crank angles at or after TDC to benefit expansive heating and positive net work production.

Thus, one or more stratified expansion cooling patterns reduce back work during compression BTDC and/or one or more injections of H$_2$ at or after TDC provides heating for increasing net positive work production. In response to electrical field control by 1001 (see FIG. 10A) as established by insulated electrical conductor 1125 and/or a suitable circuit including capacitors 1113 and/or 1142 one or more Lorentz thrusts of hydrogen and/or other negative expansion He or Ne ions accelerates initiation and completion of combustion in adaptively controlled subsonic, sonic, and/or supersonic multi-burst injection patterns. One or more spark and/or corona discharges may also be applied at, near, or beyond electrodes 1185 and 1184/1186 in response to electrical field control by 1001 as established by insulated electrical conductor 1125/1183/1186/1184 and/or a suitable circuits including components such as capacitors 1113 and/or 1142. Further electrical insulation and voltage containment may be developed by dielectric capacities of tube 1188, fluids in annular space 1116, capacitor assemblies 1113 and 1142 along with potting dielectrics around such capacitors and other components including actuator 1189 (e.g., a piezoelectric actuator), optical instrumentation fibers and sheathing assembly 1117, and dielectric sleeve 1182 around conductor 1183.

In other embodiments additional facilitation of such operations is provided by operation of suitable valve operator 1189 to produce desired operations such as vibration of tube 1188 and reed or sleeve valves 1169 in zone 1170 to provide high frequency multi-bursts of fluid flow out of, around, or between 1170 and 1169 into annular space between electrode 1183/1186 and 1185. Such multi-burst injections may be further divided by Lorentz thrust multi-bursts to produce various patterns of subsonic, sonic or supersonic hydrogen ion characterized combustion. One or more additional accelerations of ignition and completion of combustion events may be provided by corona discharges following very rapid electric field production and/or discharge through electrode circuit 1125, capacitor 1113, and/or 1142, electrodes 1183, 1184, particularly in the excitation pattern of electrically and thermally excited hydrogen injection patterns including ions and other particles swept by ions and/or pressure gradients including swirl.

Figure 12A:
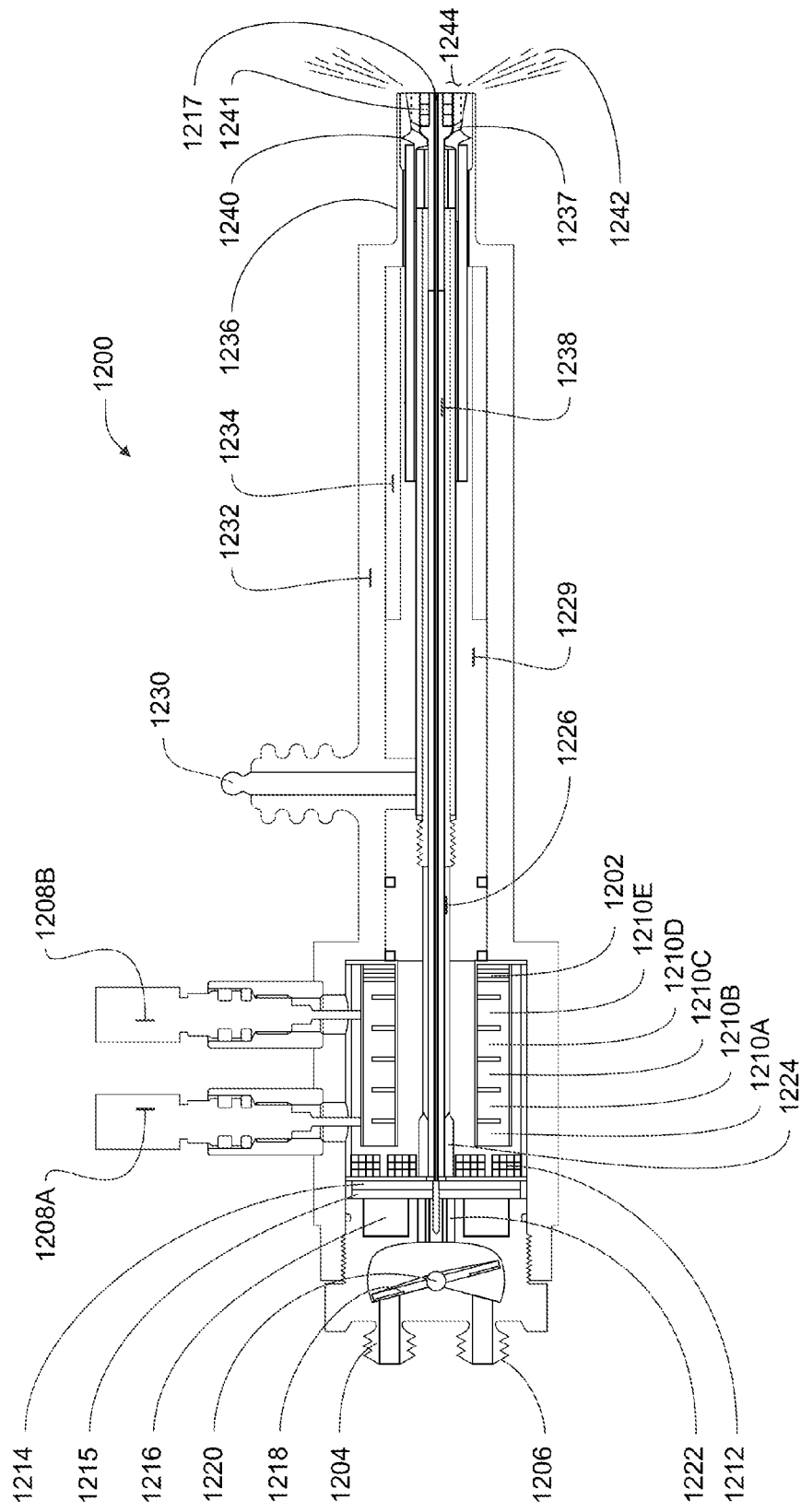
FIG. 12A shows an injection and ignition system embodiment for applications with engines that have higher piston speeds and/or more limited component space.

FIG. 12A shows an injection and ignition system embodiment 1200 for applications with engines that have higher piston speeds and/or more limited component space. In operation, system 1200 utilizes process control computer 1202, suitable fittings for connection of port 1204 to pressure regulator 1003 (see FIG. 10A) for flow control by supply selector valve 1218 to admit fluid from tank 1024 or 1020 (see FIG. 10A) through ports 1222 and 1224 to annular space 1226 to be further controlled by valve actuator assembly 1214, 1215 (e.g., piezoelectric, magnetostrictive, hydraulic, pneumatic or electromagnetically actuated) and valve 1238 to allow flow of positive J-T expansion cooling fluid through annular passageway between electrodes 1240 and 1236 to provide delivery of one or more injections of expansive cooling fluid to reduce the back work BTDC in combustion chamber 1244.

In the instance that an electromagnetic valve actuator is chosen, in an embodiment valve actuator disks 1214 and 1215 are guided by the valve stem shaft of valve 1238 that operates unidirectionally in the bearing within passageways 1224. Valve actuator disks 1214 and 1215 are connected to limit the axial travel of either disk for the purpose of developing kinetic energy for quick opening and closing of valve 1238 and/or resonant uniaxial reciprocation of valve 1238.

Just before, at, or after TDC supply selector valve 1218 is rotated counterclockwise to close the passageway to port 1204 and open the passageway from port 1206 and expansive heating fluid (e.g., negative J-T coefficient) from tank 1020 is allowed to flow at or after TDC through suitable fittings from pressure regulator 1005 (see FIG. 10A) to fitting 1206 and thus through passageways 1222 and 1224 to passageway 1226 for control by valve actuator 1214, 1215 to provide one or more injections of expansive heating fluid (e.g., H$_2$) into combustion chamber 1244. Control of rotary positions of valve 1218 by controller 1202 is by a suitable subsystem such as a piezoelectric actuator with suitable linkage or a rotary torque pneumatic, hydraulic, or electric stepper motor that drives rotor shaft 1220 of valve 1218.

In an embodiment low voltage current supplied through insulated conductor 1208A powers electromagnet windings 1212 to overcome attraction of armature assembly 1214, 1215 by permanent magnet 1216 that provides force to hold normally closed valve 1238 shut against the valve seat of annular passageway 1226. Upon such opening of valve 1238 fluid from tank 1024 or 1020 (see FIG. 10A) flows into combustion chamber 1244 depending upon the position of supply selector valve 1218.

Transformer windings 1210A, 1210B, 1210C, 1210D and 1210E convert lower voltage supplied by conductor 1208B and/or collapse of one or more windings 1212 to progressively higher voltage in parallel and/or series connected inductors 1210A, 1210B, 1210C, 1210D, and 1210E for providing an ion current from relatively close gaps between electrode points 1240 and electrode 1236. After such ion current is established the voltage applied to electrodes is adaptively adjusted to produce additional ion current, ion population, and Lorentz thrust for launching ions in subsonic, sonic or supersonic injection patterns in combustion chamber 1244 as shown in FIGS. 3A, 3B, 4A, and/or 4B.

Very short electric field pulses such as may be produced by inductor assembly 1210A-1210E applied through conductor 1230 and/or capacitor 1234 may be utilized produce corona discharge in the pattern of ions previously launched into combustion chamber 1244 to further accelerate initiation and completion of combustion at one or more adaptively controlled crank angles at or after TDC to benefit expansive heating and positive net work production. In some embodiments, high voltage containment of the subsystems disclosed is provided by utilization of glass or glass-ceramic for body 1232. Insulator 1229 may be a suitable high temperature thermoplastic or thermoset polymer or it may be incorporated in glass or glass ceramic 1232.

Electromagnets and/or permanent magnets 1241 are utilized in some embodiments to change the pattern of ions that are launched into combustion chamber 1244. Thus, by adaptively controlled variations of the fluid pressure delivered through fittings 1204 and/or 1206, ion-production profile, ion launch velocity, geometric influence of straight or swirl electrode flutes 1233 (See FIG. 12B), and/or magnetic lens influence, the included angle 1242, penetration velocity, fluid injection and/or ion injection pattern are controlled or benefited. Such injections include one or more events before TDC with expansive cooling fluids and/or one or more injections at or after TDC with expansive heating fluid including hydrogen and hydrogen ions. Control by controller 1202 through wireless, conductive or optic fibers 1217 can be interactive with suitable instrumentation to detect piston and/or crankshaft, and/or flywheel and/or cam shaft acceleration and/or deceleration and correlation to the effective combustion chamber pressure. Instrumentation may also detect ion penetration and/or patterns, as well as fluid injection penetration and/or combustion patterns. In other embodiments, the instrumentation may measure temperature of combustion chamber inventories including expansive cooling and/or expansive heating and/or combustion patterns and/or peak combustion temperature.

Important variations of the system shown in FIG. 10A enable applications that greatly reduce or eliminate mechanical pumping energy and/or fluid compression apparatus for pressurization of gaseous fuel substances to suitable pressures for direct injection into internal combustion engines such as gas turbines and/or positive displacement piston or rotary engines. In many instances, the pressure provided for compressed gas storage of natural gas, ethane, propane, and/or hydrogen is sufficient to cyclically load pressure producing processors that provide pressure amplification to enable efficient operation with higher pressure stratified charge combustion. This includes operation from a suitably charged storage tank through the process of nearly emptying the storage tank.

Figure 10B:
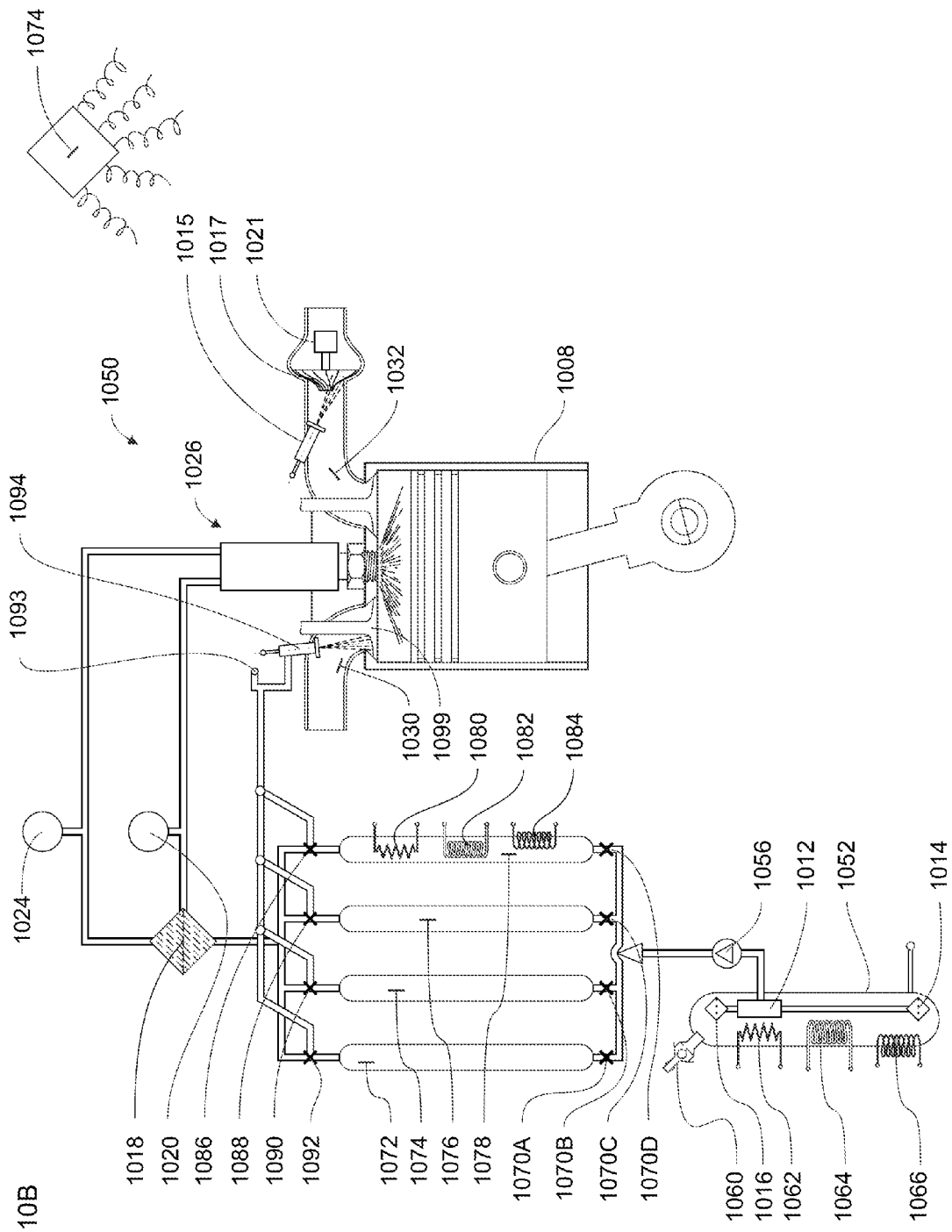
FIG. 10B illustrates a system operative to apply low grade heat to pressurize fuel for direct-injection J-T cooling BTDC and direct injection at or after TDC for J-T heating.

System 1050 shown in FIG. 10B applies of low grade heat to pressurize fuel for direct-injection in embodiments including J-T cooling (e.g., positive J-T coefficient) BTDC and direct injection at or after TDC for J-T heating (e.g., negative J-T coefficient) along with lower pressure fuel injection to produce momentum pumping by air inducement injector 1094 to enable engine 1008 to exceed 100% volumetric efficiency. In an illustrative operation, a liquid fuel such as methanol or propane is transferred through port 1060 into tank 1052 at 4 to 8 BARG (60 to 120 PSIG) and subsequently natural gas or hydrogen is transferred through port 1060 to pressurize tank 1052 at 250 to 700 BARG (3600 to 10,000 PSIG). The liquid fuel is selected by controlled operation of three-way valve 1012 to load a selected processor chamber such as 1072, 1074, 1076, or 1078 for addition of regenerative energy such as low grade heat to convert the liquid fuel to higher pressure constituents such as vapor and/or carbon monoxide and hydrogen by reactions that produce more molecules of products than presented as reactants such as shown in Equations 11 or 12.

Accordingly, high pressure products such as carbon monoxide and/or carbon dioxide are separated by media 1018 and stored in accumulator 1024 for direct injection BTDC to provide expansive cooling and reduced back work BTDC to improve BMEP. High pressure hydrogen is separated by suitable media such as 1018 and stored in accumulator 1020 for direct injection such as at or after TDC to provide expansive heating and further improve positive torque development and BMEP along with improved combustion characteristics to further improve BMEP.

System 1050 accommodates fluid fuel pressurization such as one or more cryogenic substances, ambient temperature substances, a vaporous or gaseous substances, elevated temperature substances and/or various mixtures of such substances from suitable storage tank 1052 are transferred through reactor-filter 1014 and/or 1016 to and through three-way valve 1012 depending upon the flow selections determined by adaptive control by a suitable system such as microprocessor 1074. Delivery of such substances from tank 1052 may be provided by pressure drop from the charge pressure established by previous delivery through charge port 1060 from a suitably pressurized source and/or by as suitable pump 1056 by suitable increases in pressure of the contents in response to thermal heating and/or production of one or more voluminous substances as a result of endothermic reactions upon energy addition by electrically induced plasma, and/or resistance heater 1062 and/or inductive heater 1066 and/or circulation of a heated fluid such as engine or fuel cell coolant in sub-system 1064. Fluid pressure thus produced in tank 1052 and/or by pump 1056 is sufficiently higher than the fluid pressure during cyclic low pressure emptying cycles of processors 1072, 1074, 1076, and 1078 for purposes including providing for quick loading such processors by substance transfers from tank 1052.

Fluid thus transferred from tank 1052 enters one or more processors 1072, 1074, 1076, and/or 1078 according to flow control by suitably operated valves 1070A, 1070B, 1070C and 1070D. As an illustrative operation that may be performed by each processor, in accordance with fluid flow control by valves 1070A, 1070B, 1070C, 1070D and corresponding operation of valves 1086, 1088, 1090, and 1092, fluid transferred into processor such as 1078 is energized to a higher temperature and/or higher pressure (such as 300 to 700 BARG or 4500 to 10,000 PSIG) as a result of energy transfer from electrically induced plasma and/or resistance and/or induction heaters 1080 and 1084 and/or fluid circulation heater 1082 to gain heat from fluids such as fuel cell or engine coolant or the exhaust of an engine such as 1008.

Such energization of fluid in a processor such as 1078 to provide cyclic pressure amplification is facilitated by cyclic depressurization of processor 1078 whereby fluid is transferred out of 1078 through three-way valve 1086 to collector manifold 1093 for low pressure (such as 3 to 14 BARG or 45 to 205 PSIG) injection into the intake port 1030 of engine 1008 or into another application such as turbine 1017 which may be a turbo charger or turbo generator to power compressor or generator 1021. This enables the pressure in 1078 to be rapidly reduced to sufficiently lower pressure to be quickly recharged with a much greater inventory of fluid from tank 1052.

Between such low pressure cycles processor 1078 energizes fluid to pressures such as 300 to 700 BARG (4500 to 10,000 PSIG) which is routed through valve 1086 and suitable conduits for delivery to suitable filter 1018 to separate other substances from hydrogen that is stored in accumulator 1020. Other substances such as methane, carbon monoxide, carbon dioxide, nitrogen etc., are transferred from filter 1018 into storage accumulator 1024. A suitable injector, such as injector 1026, injects expansive cooling substances from accumulator 1024 at one or more adaptively timed events BTDC to reduce or benefit back work reduction by distribution of such substances within preferably surplus air for completion of combustion after TDC. At or after TDC injector 1026 provides one or more adaptively timed injections of hydrogen to provide expansive heating and to accelerate initiation and/or completion of combustion to maximize BMEP.

Depending upon the duty cycle of engine 1008 and fuel rate, two or more processor cells such as 1072 and 1076 may be simultaneously cycled to provide pressure amplification or another combination may be controlled to benefit the number of cells that pressurize for direct injection and cyclically provide lower pressure injection to intake port to increase air intake by momentum pumping. Control of various operational permutations are provided by controller 1074 to provide proportional response to the rate of pressure change in accumulator 1020 and/or 1024.

Figure 10C:
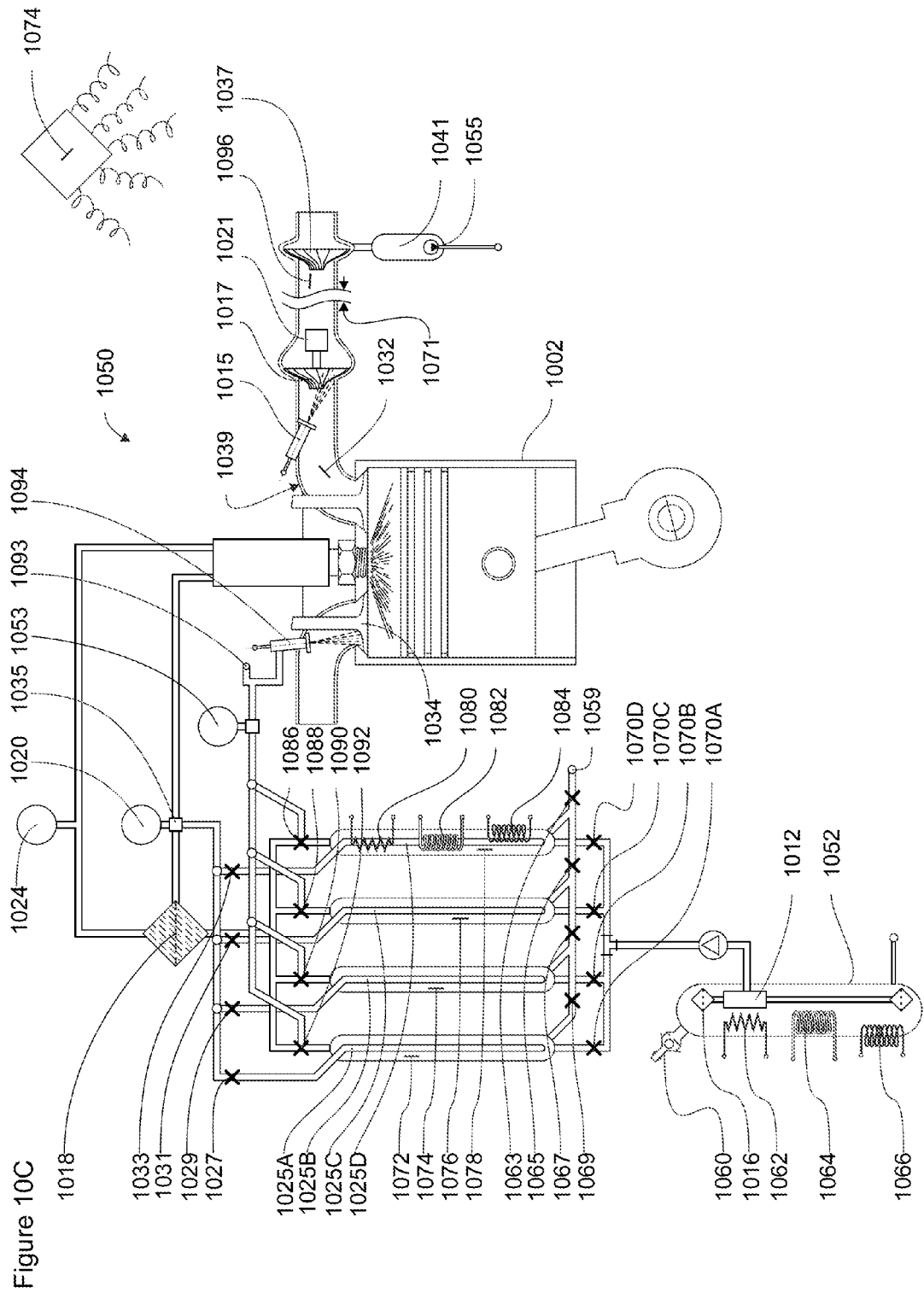
FIG. 10C is a schematic cross-sectional representation of a processor apparatus for converting a donor fluid to hydrogen according to a representative embodiment.

FIG. 10C shows a hydrogen generator system 1050 according to a representative embodiment in which a hydrogen donor fluid such as an alcohol or hydrocarbon $H_xC_y$, is converted in a processor such as 1072, 1074, 1076, or 1078 to hydrogen and other constituents such as carbon, carbon monoxide, or carbon dioxide. Illustratively, natural gas stored in tank 1052 at a suitable pressure such as 700 BARG, full to 7 BARG nearly empty (10,000 PSIG, full to 100 PSIG nearly empty) is cyclically transferred into a processor such as 1078 and endothermically reacted by utilization of suitable regenerative heat and an oxygen donor such as water to produce hydrogen and carbon monoxide at suitable pressure. Hydrogen is passed through the walls such as outward or inward into the inside volume of closed end nipple tube 1025D for delivery through valve 1033 to accumulator 1020. Other gases such as methane, ethane, propane, carbon monoxide, carbon dioxide, water vapor steam, are routed through valve 1086 and media 1018 to accumulator 1024. This enables production of suitably pressurized, separated and stored gases in accumulators 1020 and 1024 and improves the pressurization and conversion efficiency of processors such as 1072, 1074, 1076, and 1078 by removing a product such as hydrogen from other products and/or reducing the pressure of a product such as hydrogen by control of valve 1033 compared to valve 1086 and valve 1035.

Similar operation is provided at variously adapted timing regarding separator tubes 1025A, 1025B, 1025C, and 1025D along with valves 1027, 1029, 1031, and 1033 to produce suitably pressurized, separated and stored gases in accumulators 1020 and 1024 and to improve the pressurization and conversion efficiency of processors like 1078 by removing a product such as hydrogen from other products. And similarly improving efficiency by providing reduced pressure of a product such as hydrogen by control of such valves. In certain applications, considerable convenience and more rapid filling of processor chambers such as 1072, 1074, 1076, 1078 etc., is provided by initially pressure loading into tank 1052 a relatively small amount of pressurization agent such as water, liquid propane and or a wet antifreeze such as a water solution with methanol, ethanol, propanol, butanol etc. Such pressurization agent addition through port 1060 may be made at a relatively low pressure such as 2-4 BARG prior to filling with natural gas to a suitable pressure such as 300 to 700 BARG (4500 to 10,000 PSIG). As the natural gas is transferred out of tank 1052 through filter 1016, the pressure drops and at a certain level controller 1074 provides for gasification of the liquid pressurization agent by reactor-filter or heat generators 1062, 1064, and/or 1066 in an amount that restores sufficient pressure to provide suitable natural gas transfer rates into the processor chambers.

Nipple tubes such as 1025A, 1025B, 1025C and 1025D may be made of ceramics such as ceramic, silicon-carbide, graphite with silicon carbide conversion coatings, or various carbon-glass composites in which suitably micro-porous ceramics may in some embodiments be heated by induction and/or otherwise serve as resistance elements. In other embodiments such hydrogen separators tubes are heated by surface plasma that is generated by skin effect. Particularly high fatigue endurance strength with chemical inertness is provided by a composite of silicon-carbide fibers that is formed and infiltrated with silicon carbonitride to the extent desired for micro-porosity development. Such silicon carbide and silicon carbonitride composites include types generated from polymer precursors.

In some embodiments, processors 1072, 1074, 1076, 1078, etc., are packaged as sub-systems within exhaust system zones 1032 and/or 1071 and other features of the engine's exhaust system 1039 along with momentum transfer injector 1015, turbo-charger 1017, 1021 and turbo exducer 1037. This provides considerably greater opportunity for beneficial heat transfers and efficient system insulation, fiber reinforcement, and armoring along with sufficient cooling of the water content of the exhaust gases to facilitate collection and storage in insulated receiver 1041. In case emergency depressurization may be useful, injectors 1094, 1026, and/or 1015 are opened to pass pressurized gas into the exhaust system including passage through open combustion chamber exhaust valves to safely blow down into the exhaust pipe between engine 1008 and turbo-motor 1017 and/or 1037. Thus the exhaust system further serves as the pressure and heat attenuator or safety snubber for emergency blow down of accumulators 1020 and 1024, processor systems 1072, 1074, 1076, 1078, tank 1053 and/or tank 1052.

In certain applications, a predetermined amount of substance that can perform as an anti-freeze such as ethanol, methanol, ammonia or urea is charged into tank 1052 before adding gaseous fuel such as natural gas or hydrogen. As the gaseous fuel is depleted, a small liquid pump 1055 transfers water from insulated receiver 1041 into tank 1052. The antifreeze forms a solution with the water to prevent it from freezing in cold ambient conditions. On occasions that it is desired to increase the pressure in tank 1052, controller 1074 initiates one or more liquid to gas phase changes and/or production of products such as carbon monoxide, carbon dioxide, hydrogen, and/or nitrogen to further pressurize tank 1052 as a result of energization by electrically induced plasma and/or resistance or inductive heating and/or by circulation of a heated fluid.

A long standing problem with various chemical reaction processes that produce hydrogen and other substances from feed stocks that contain hydrogen is recombination and/or formation of other compounds with hydrogen. This causes the hydrogen production efficiency to be diminished. Certain embodiments avoid this inefficiency by removing the hydrogen as it is formed by transfer through a hydrogen filter such as a molecular separator and/or a proton exchange membrane and/or a galvanically induced proton exchange membrane for purposes such as injection and expansive heating after TDC and/or to operate a hydrogen fuel cell to produce electricity.

Important advantages provided by systems, such as shown in FIGS. 1A, 1B, 2A-2C, 5A-5C, 6, 10A-10C, and 11A includes separation of hydrogen from potential oxidants or reactants with hydrogen such as carbon monoxide, carbon dioxide, nitrogen, and other substances. In addition to facilitating separated J-T expansive cooling and J-T expansion heating, this allows such reactants to be pressurized by separate methods and/or pathways compared to hydrogen using considerably less expensive material selections for pressurization and containment. It also allows pressurization of such separated substances to different extents for purposes of benefiting the net work production by host applications such as a heat engine or fuel cell.

Illustratively, reactants such as methane and water vapor from tank 1052 can be transferred at 3 to 10 BARG into a processor such as 1078 through valve 1070D while valve 1086 is open to charge accumulator 1053 and/or to be intermittently injected by 1094 to induce delivery of an increased mass of air into the combustion chamber when intake valve 1099 is open. Improved performance of turbo expander 1017 is provided by additional flow from port 1093 to injector 1015 for temperature control including combustion of fuel gases to increase the temperature and momentum of exhaust gases that pass through 1017 and/or cooling with water vapor.

Adjustment of the composition of fluids that exit processor 1078 after thermochemical regeneration and pressurization, along with adjustment of such cooling and/or heating potential is provided by controller 1074 and may include intermittently increasing the flow and delivery of water from a suitable source such as 1041 to port 1059 for delivery into processors such as 1078 at appropriate times to provide for such cooling.

Upon satisfactory loading of a processor such as 1078, valves 1070D, 1033, 1063 and 1086 are closed while pressure is increased to 700 BARG or more by endothermic energy additions such as achieved by circulation of hot engine coolant and/or exhaust gases through heat exchanger 1082 and/or electrically induced resistance, induction and/or plasma heating by heat generators and/or exchangers 1080 and/or 1084. Valves 1070A, 1070B, 1070C; 1069, 1067, 1065; and 1092, 1090, 1088 similarly correspond with processors 1072, 1074, and 1076, respectively. Pressurized hydrogen that is separated by filter media 1018 and/or by 1025D is delivered through valve 1033 into accumulator 1020. Other gases are transferred to filter media 1018 to further remove hydrogen that is transferred to accumulator 1020 while remaining pressurized gases are transferred into accumulator 1024.

After satisfactory production, one or more such separations, and transfers of pressurized hydrogen into accumulator 1020 and transfers of other high pressure gases into accumulator 1024, gases remaining in processor 1078 are transferred through three-way valve 1086 into accumulator 1053 and/or to induce increased air intake to the engine and/or to increase exhaust flow momentum by suitable intermittent or continuous operation of injectors 1094 and/or 1015. Injector 1015 may from time to time deliver gases from accumulator 1053 and/or other fluids that are placed in reservoir 1041 to control the operating temperature and/or pressure of turbine 1037 as benefited by system information computer processor 1074.

In certain embodiments, exhaust gases are circulated from suitably high temperature zone 1032 to provide rapid heating of reactants by heat exchangers such as 1082 in processors such as 1072, 1074, 1076, and 1078. Exhaust gases from zone 1096 may provide sufficient heating of the contents of tank 1052 to produce desired pressure for quick deliveries to thermochemical processors 1072, 1074, 1076, and/or 1078; however, such pressurization may also be accelerated by circulation of higher temperature gases from zone 1032. In some instances, tank 1052 may occasionally be used to store liquid fuels, such as ammonia, propane, methanol, ethanol, butanol or cryogenic methane and/or hydrogen, and pressurization of the contents by circulation of exhaust gases from zones 1032 and/or 1096 through heat exchangers such as 1064 and/or 1082 provides: production of vapor pressure for delivering fuel through filter reactor 1016 and three-way selector valve 1012 to processors such as 1072, 1074, 1076, and 1078; cooling of exhaust gases to increase the amount of water collected by exducer 1037; reduced back pressure by cooling of exhaust gases before or after passing through optional turbo-expander 1017 to benefit overall performance of engine 1008; and higher overall efficiency of operation by minimizing the amount of electricity supplied by generators such as 1062, 1066, 1080, and/or 1084 to produce resistive, inductive, or plasma energy conversion.

Figure 9:
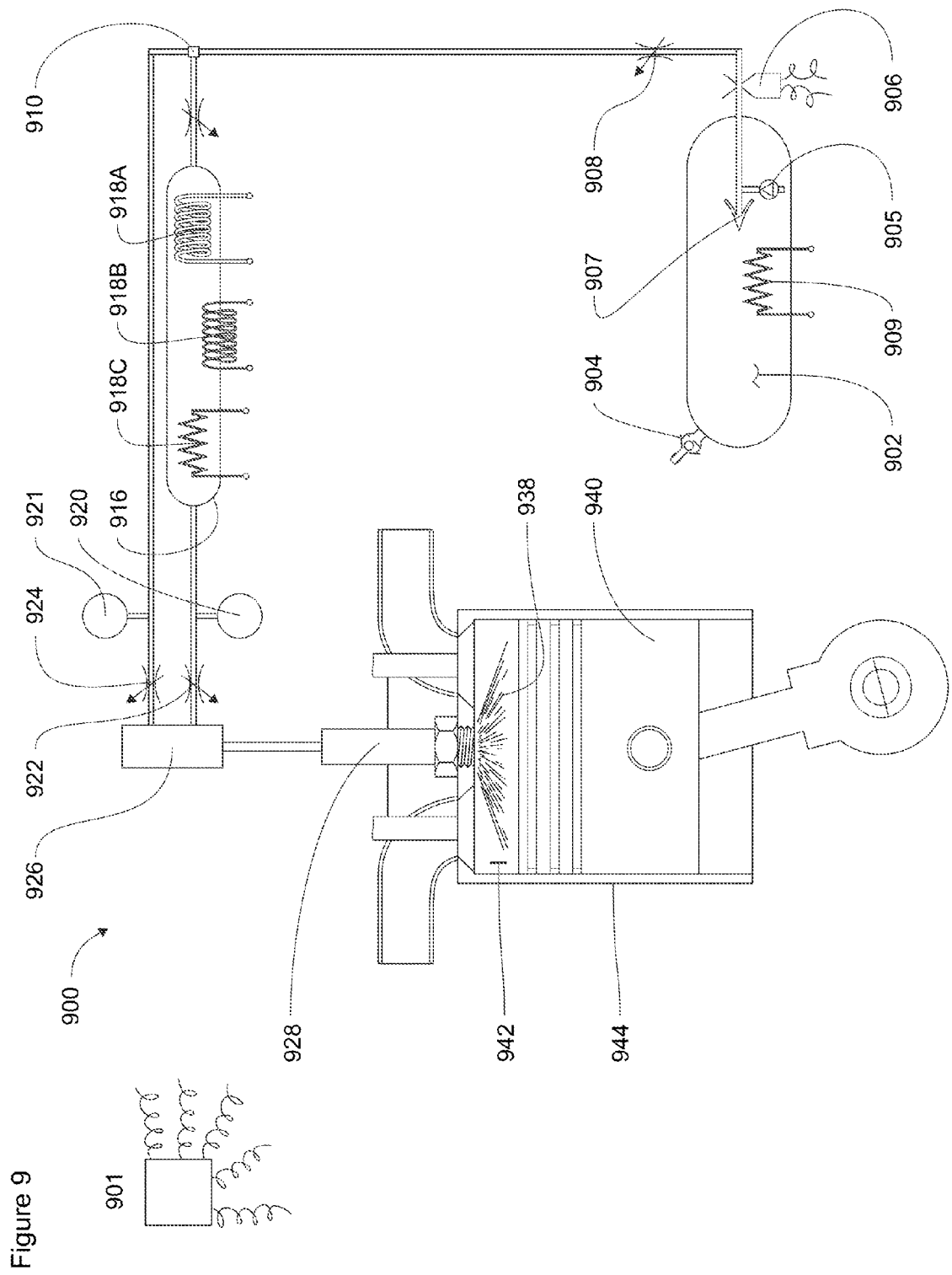
FIG. 9 shows a system embodiment for receiving fuels such as cryogenic methane or hydrogen liquids, solids, or gases.

FIG. 9 shows an embodiment 900 including a tank 902 for receiving fuels such as cryogenic methane or hydrogen liquids, solids, or gas; compressed ambient-temperature fluids such as natural gas, ammonia, ethane, or propane; and/or liquid fuels such as alcohols or alcohol-water solutions along with mixtures of such fuels that enter through a suitable charge port 904 and may be pressurized by a suitable heater 909 and/or pump 905 and/or delivered by pressure drop through check valve 907. Fluids at suitable pressure leave tank 902 through shut-off valve 906 and pressure regulator 908.

Partial oxidation reactions such as shown in illustrative Equations 13 and 14 (below) can complement previously detailed operations and/or produce heat and/or provide useful applications of energy during regeneration of a vehicle's kinetic energy during deceleration and/or heat rejected from an engine or fuel cell. Illustratively, one or more dense oxygen donors such as $C_2H_3O_3$, $C_2H_3O_4$, $C_4H_5O_4$, $C_5H_7O_4$, $H_2O_2$, or other peroxides can be utilized along with adaptively adjusted amounts of water to produce the desired oxidation and heat generation to operate the reaction at endothermic or exothermic results and at relatively low or high temperatures. Similarly oxygen can be produced by electrolysis of water using electricity and/or rejected heat or by filtration from the atmosphere using such regenerative energy sources to provide desired partial oxidation and heat generation to operate the reaction at endothermic or exothermic results and at relatively low or high temperatures.

$$2CH_3OH + H_2O_2 + HEAT \rightarrow 2CO_2 + 5H_2 \quad \text{Equation 13}$$

$$CH_4 + O_2 + HEAT \rightarrow CO_2 + 2H_2 \quad \text{Equation 14}$$

In instances that the fluid stored in tank 902 is predominantly able to provide J-T expansion cooling it is passed into accumulator 921 and through pressure regulator 924 and three-way valve 926 to injector 928 for one or more injections 938 to minimize back work by engine 944 that are adaptively controlled by microprocessor 901. Fluid from tank 902 is also routed through three-way fitting or valve 910 to reactor 916. Hydrocarbons and other substances such as ammonia that can be dissociated in reactor 916 to produce J-T expansion heating derivatives (e.g., $H_2$) are processed by addition of energy such as heat by direct or indirect circulation of fluids such as engine coolant and or exhaust through heat exchanger 918A and/or by electric inductive heating by 918B and/or by resistive element 918C.

Carbon donor fluids such as hydrocarbons are dissociated to produce carbon that may be deposited on carbon or other suitable substrates such as may be provided within reactor 926. Co-produced hydrogen is passed to accumulator 920 and pressure regulator 922 and through three-way valve 926 and suitable injector 928 to provide one or more injections 938 into combustion chamber 942 at or after TDC to produce expansive heating and greater work production by piston 940 and thus improved BMEP by engine 944. Equation 15 shows production of activated carbon and hydrogen from a donor such as methane produced by an anaerobic digester, decaying permafrost, or clathrate deposits in the ocean. Equations 16 and 17 show how to utilize such hydrogen and carbon dioxide to make stored liquid fuels. Carbon dioxide can be collected from such sources and/or from bakeries, breweries, calciners, ethanol plangs or fossil fueled engines.

$$CH_4 + Heat \rightarrow C + 2H_2 \qquad \text{Equation 15}$$

$$CO_2 + H_2 \rightarrow H_2CO_2 \text{(formic acid)} \qquad \text{Equation 16}$$

$$CO_2 + 3H_2 \rightarrow CH_3OH \text{(methanol)} + H_2O \qquad \text{Equation 17}$$

Equations 18 and 19 show how to utilize regenerative energy such as engine waste heat or deceleration of a vehicle and such liquid fuels along with another waste carbon donor "C" such as soluble fiber, starch, crop wastes or urea, to produce higher heating value mixtures of carbon monoxide and hydrogen.

$$CH_3OH + H_2O + \text{"C"} + Heat \rightarrow 2CO + 3H_2 \qquad \text{Equation 18}$$

$$H_2CO_2 + \text{"C"} + Heat \rightarrow 2CO + H_2 \qquad \text{Equation 19}$$

Ammonia from tank 902 is similarly dissociated in reactor 916 to produce nitrogen and hydrogen. The hydrogen is used as an expansive heating substance in one or more injections at or after TDC. In some embodiments such nitrogen is separated by suitable filtration and in other instances some or all of the nitrogen is injected along with co-produced hydrogen to provide net heating upon expansion in combustion chamber 942.

Figure 13A:
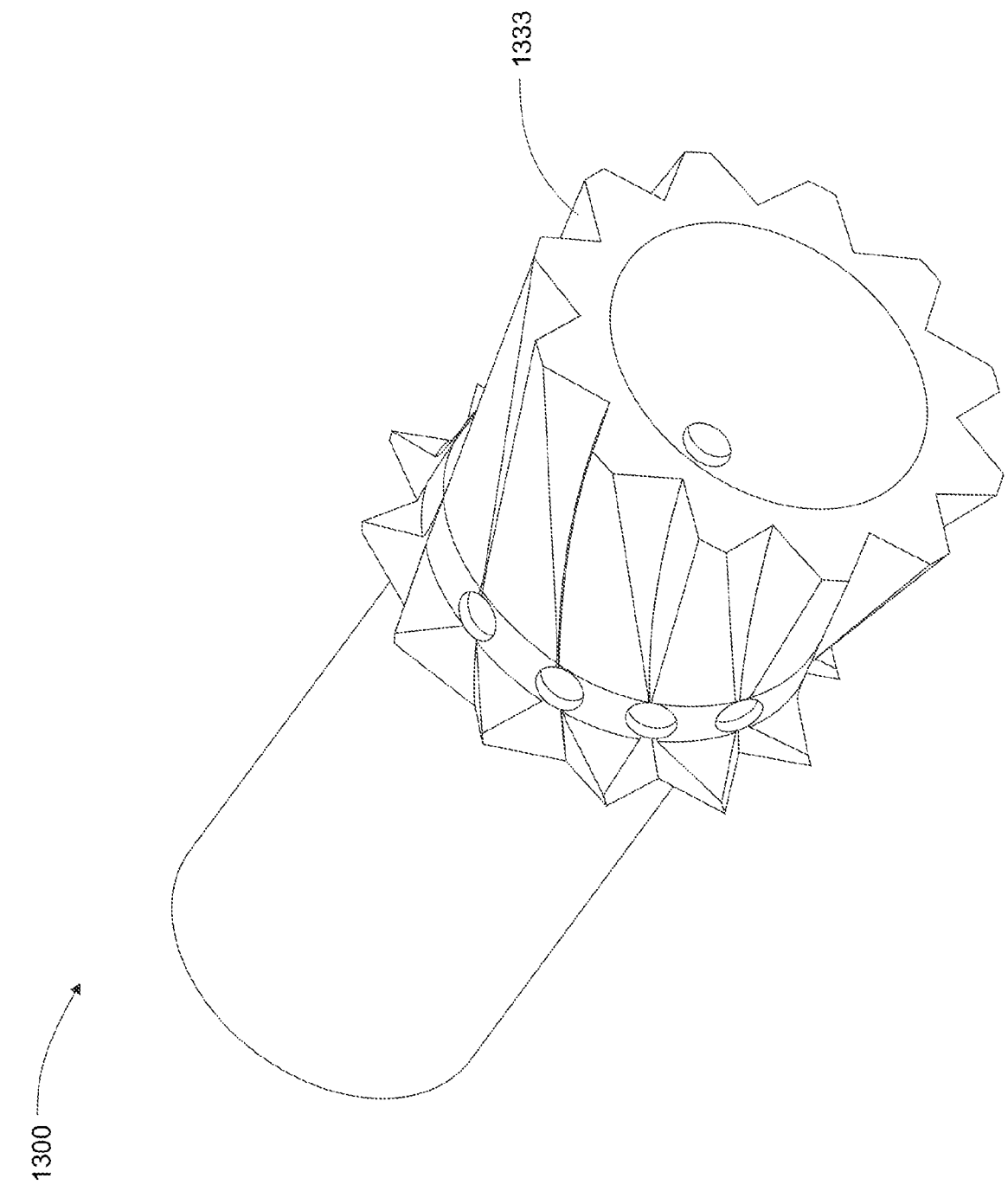
FIG. 13A shows details of a valve seat electrode according to another embodiment that may be utilized with systems such as shown in FIGS. 11A and 12A.

FIG. 13A shows details of a valve seat electrode 1300 according to another embodiment that may be utilized with appropriate components of systems such as 1100, 1200 shown in FIGS. 11A and 12A, respectively. For example, conductor 1183 and electrode 1240 may be replaced with electrode 1300. Electrode 1300 includes channels 1333 that extend the path for ion current acceleration and impart a rotational momentum to fuel and ions ejected from the tip of the injector, such as injectors 1100 and 1200. Thus gases can be thrust into the combustion chamber in more or less conical flow patterns with a variety of included angles including nested cones as provided by the impetus of the fuel pressure drop, spline channels 1333 and the angular momentum along with adjustments that may be made by magnetic forces applied by permanent or electromagnets 1241 within the electrode 1236 and/or around the launch zone in electrode 1236, to control the distribution of included angles.

Figures 12B, 12C:
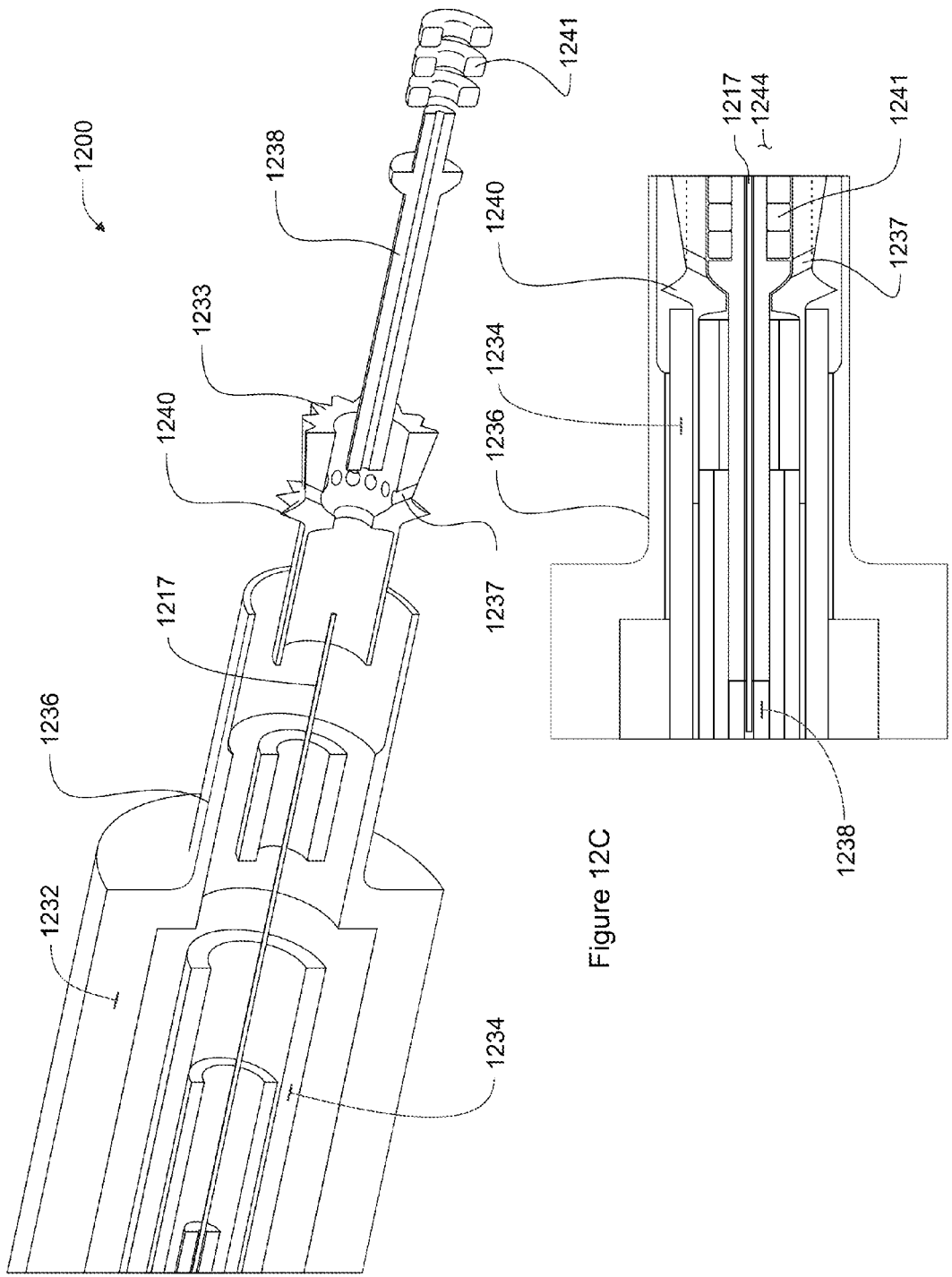
FIG. 12B is a partial exploded view of the tip portion of the injector shown in FIG. 12A.
FIG. 12C is a side view of a cross-section of the outward opening valve shown in FIG. 12A.
Figure 12D:
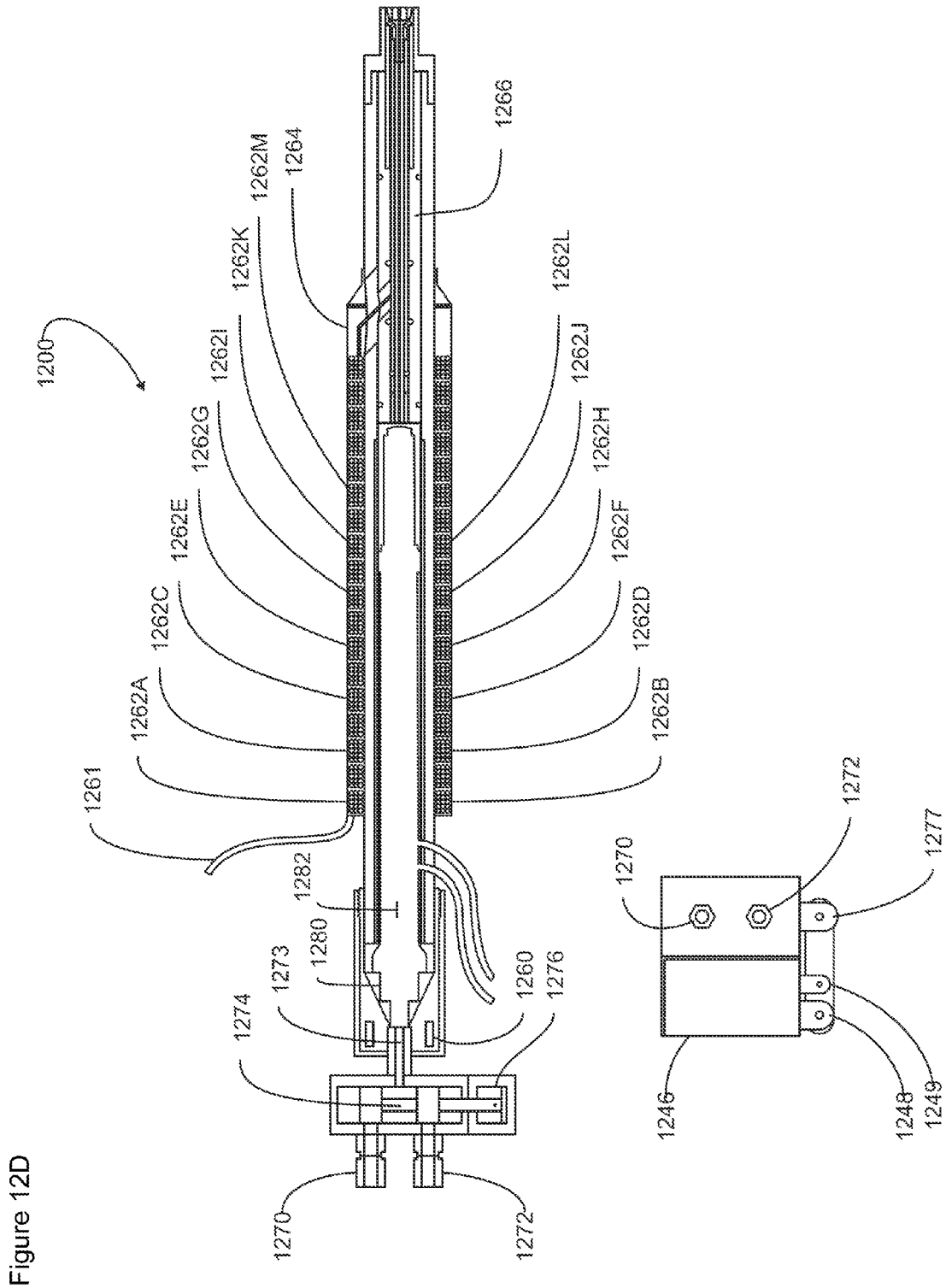
FIG. 12D shows an end view and a longitudinally sectioned side view of an injector embodiment, including an integrated fuel injector and ignition system for providing operation of an internal combustion engine with one or more new thermodynamic cycles.

FIG. 12D shows an end view and a longitudinally sectioned side view of embodiment 1200 including an integrated fuel injector and ignition system for providing operation of an internal combustion engine with one or more new thermodynamic cycles including new sequences of fluid injection for J-T expansive cooling to reduce back work during compression, hydrogen injection to produce J-T expansion heating at or after TDC to increase net work followed by injection of J-T expansion cooling fluid to reduce or eliminate oxides of nitrogen and/or ozone in the exhaust. Commensurately, a new back work reducing compression cycle, expansive heating and combustion pressurized power cycle including production and consumption of oxides of nitrogen and/or ozone is accomplished.

Combustible fluids with positive J-T expansion coefficients provide slower combustion rates in comparison with hydrogen which has a negative coefficient of expansion. Hydrogen combusts at rates that are 9 to 15 times greater than many positive J-T expansion fuels. This difference can be controlled to enable improved methods of operation disclosed herein of internal combustion engines.

The high rate of one or more injections of expansive cooling fluid and high rate of combustion of hydrogen characterized fuel and production of oxides of nitrogen and/or ozone in stratified regions that stimulate accelerated completion of combustion of subsequent injections of expansive cooling fuels to reduce or eliminate oxides of nitrogen in the exhaust cycle of operation. Even in full power production mode at the highest cycle frequency ratings such combustion operations can be initiated at or after TDC and completed before about 110° after TDC to maximize torque and work production per the sum of fuel heating values.

An embodiment 1200 shown in FIG. 12D provides rapid selection of fluid by an amplified speed and displacement system with piezoelectric actuator 1246. Amplified speed and motion (although at the expense of force) is provided by the mechanical advantage of linkage 1248-1249-1277 to position a suitable valve such as spool valve 1274. Fluid injection can be by amplified or direct displacement of a fluid injection valve such as outward opening valve 1238 from the valve seat as shown in FIG. 12B to allow fuel flow through ports 1237 which may be located on either or both sides of ignition tips 1240 as may be provided by different embodiments. This achieves very rapid selection of J-T expansion cooling or J-T expansion heating fluid (e.g., hydrogen) coupled with rapid fuel injection of such fluid selections into the combustion chamber. Deliveries into the combustion chamber of such fluids may further be divided and/or accelerated as sub-bursts by Lorentz thrusting. Switching between selections of J-T expansion cooling or heating fluids can be made rapidly such as 0.08 milliseconds or less and similar times for each fluid injection into the combustion chamber.

Illustrative operation of a new engine cycle embodiment provides one or more combustion chamber injections of positive J-T expansion cooling fluids to produce stratified charge cooling of the highest temperature oxidant before TDC; followed by one or more injections of negative J-T expansion fluids before, at or after TDC to produce stratified heating including ignition before, at, or after TDC to maximize net work production; followed by one or more stratified charge injections of positive J-T expansion fluids to reduce the rate of heat release sufficiently to avoid release of oxides of nitrogen and/or ozone into the exhaust stream. Even in instances that the peak combustion temperature exceeds about 2200° C. (4000° F.) and oxides of nitrogen and/or ozone are produced within stratified charge regions that are characterized by hydrogen accelerated combustion as detected by sensors housed within the outward opening fuel control valve, positive J-T expansion fluids can be quickly selected for one or more subsequent injections into regions that have produced oxides of nitrogen to effectively reduce the rate of combustion and favorably consume such oxides of nitrogen and/or ozone sufficiently to prevent oxides of nitrogen from subsequently passing through the exhaust valve into the exhaust system and thus overcome the need for expensive exhaust after treatment and/or exhaust gas recirculation. Thus the embodiment 1200 provides the capability for operating a combustion chamber with reduced back work followed by higher net work production including higher thermal efficiency by accelerated combustion at or after TDC and consuming oxides of nitrogen and/or ozone by generating such activated oxidants in stratified patterns that enable them to be consumed by positive J-T expansion fuels to produce non-objectionable products of combustion such as $H_2O$, $N_2$ and/or $CO_2$.

In operation pressurized fluids that provide expansive cooling are delivered through one or more ports such as 1270 and fluids that provide expansive heating are delivered through port 1272. Spool valve 1274 provides rapid selection in response to a suitable driver such as a push-pull hydraulic, electromagnetic, pneumatic or piezoelectric actuator 1276 as depicted in the end and side views of FIG. 12D.

The push-pull displacement of spool valve 1274 can be amplified compared to the shorter rapid piezoelectric displacement of push-pull plunger 1248 that is pinned to linkage 1277 that rotates about fulcrum 1249 to produce suitably amplified displacement of valve 1274 as forced by linkage 1277. This provides rapid selection and delivery of one or more expansive fluids through fitting 1273 to passageways over and/or through a suitable valve actuator such as a hydraulic, pneumatic electromagnetic or piezoelectric valve operator 1282 as shown. The selected expansive cooling fluid such as methane, carbon monoxide, etc., is injected into the engine at selected crank angles before TDC to reduce back work during compression and the selected expansive heating fluid is injected into the engine at selected crank angles before, at, or after TDC.

Combustion chamber pressure and temperature along with fluid injection and combustion patterns are monitored by instrumentation that communicates with computer 1260 by suitable fiber optics such as glass, quartz, or sapphire fibers that are routed from the core of the outward opening fuel control valve along, over, or within hermetically sealed piezoelectric valve actuator 1282.

In certain embodiments, computer 1260 provides orchestration of the timing and magnitude of the voltage applied by one or more power supplies (e.g., −30 to +300 VDC) to piezoelectric director actuator 1276 and subsequently to piezoelectric fuel injection valve actuator 1282 to adjust and compensate for thermal expansion differences in the components and to provide valve displacements to provide the fluid deliveries to operate the combustion chamber at idle, acceleration, cruise, and full power conditions including fuel selections that range in energy density, viscosity, and combustion characteristics from liquids such as cryogenic slush hydrogen with frozen methane crystals to fuel alcohols with dissolved urea, to gaseous mixtures of producer gas. Similarly controller 1260 provides one or more pulses of current through cable 1261 at suitable voltages to suitable parallel and/or series connected progressive inductors 1262A-M to suitably connect through insulated conductor 1264 charge one or more capacitors in annular zones 1266 to the voltage and charge accumulations for Lorentz thrusting and/or corona discharge ignition. Such embodiments sometimes utilize the operations shown in FIG. 3A, 3B, 4A, or 4B.

In another representative embodiment, a fluid delivery system 1400 for delivering positive and negative J-T coefficient fluids, similar to those described above with respect to FIGS. 10B and 10C, is shown in FIG. 14. In this embodiment, system 1400 includes a fluid delivery control valve 1500. With further reference to FIG. 15A, the fluid delivery system is connected to a first inlet port 1504 and a second inlet port 1506. Each inlet port is connected to either a negative J-T coefficient source or a positive J-T coefficient source provided by fluid delivery system 1400. Valve 1500 also includes an outlet port 1508 to selectively supply either the negative or positive J-T coefficient fluid to an engine. While this embodiment shows the fluid delivery system 1400 as an on-board fluid production system, in other embodiments, the system could be comprised of tanks that contain the desired J-T coefficient fluids.

As shown in FIG. 15A, fluid delivery control valve 1500 includes a housing 1502 through which ports 1504, 1506, and 1508 are formed. In this embodiment, valve 1500 is a spool or shuttle valve, which includes a spool 1510 slideably disposed in housing 1502. Valve 1500 includes solenoids 1512 and 1514, which are operative to pull the spool 1510 back and forth within housing 1502 thereby selectively opening ports 1504 and 1506 to fluid communication with outlet port 1508. As shown in FIG. 15A, the valve 1500 is in an intermediate state with both inlet ports 1504 and 1506 closed. FIG. 15B illustrates the valve 1500 in a first open position with the spool 1510 pulled toward solenoid 1512. In the first open position, first inlet port 1504 is opened to fluid communication with outlet port 1508 and land 1516 covers inlet port 1506. FIG. 15C illustrates the valve 1500 in a second open position with the spool pulled toward solenoid 1514. In the second open position, second inlet port 1506 is opened to fluid communication with outlet port 1508 and land 1518 covers inlet port 1504.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Also contemplated herein are methods which may include any procedural step inherent in the structures and systems described herein. Accordingly, the disclosure and associated technology can encompass other embodiments not expressly shown or described herein.

What is claimed is:

1. A method for operating an internal combustion engine including a combustion chamber and configured to perform at least a compression stroke and a power stroke, the method comprising:
   injecting a substance into the combustion chamber during a compression stroke at a temperature that is greater than or equal to 100° C. and less than or equal to 1000° C. less than a temperature inside the combustion chamber, thereby reducing an amount of work otherwise required to perform the compression stroke, wherein the first substance is selected from the group consisting of natural gas, methane, ammonia, carbon monoxide, carbon dioxide, and nitrogen.

2. The method of claim 1, further comprising conditioning the substance prior to injection such that the substance undergoes a phase change upon injection.

3. A method for operating an internal combustion engine including a combustion chamber and configured to perform at least a compression stroke and a power stroke, the method comprising:
   expanding a first substance having a positive Joule-Thomson coefficient into the combustion chamber during a compression stroke, thereby reducing an amount of work otherwise required to perform the compression stroke, wherein the first substance is pressurized to a pressure that is greater than or equal to 100 psi and less than or equal to 1000 psi higher than the pressure inside the combustion chamber at the time of expansion into the combustion chamber.

4. The method of claim 3, further comprising pre-cooling the first substance prior to expanding into the combustion chamber.

5. The method of claim 3, further comprising introducing the first substance at a temperature that is between and including 100° C. and 1000° C. less than a temperature inside the combustion chamber.

6. The method of claim 3, wherein the first substance is expanded into the combustion chamber at a crank angle of between and including 5° and 20° before top dead center.

7. The method of claim 3, wherein the first substance is pressurized by expanding a cryogenic liquid phase of the first substance.

8. The method of claim 3, wherein the first substance is selected from the group consisting of natural gas, methane, ammonia, carbon monoxide, carbon dioxide, and nitrogen.

9. The method of claim 3, wherein the first substance is direct injected into the combustion chamber.

10. The method of claim 9, wherein the first substance is injected as a stratified charge into a high temperature region of the combustion chamber.

11. The method of claim 3, further comprising expanding a second substance having a negative Joule-Thomson coefficient into the combustion chamber during a power stroke, thereby increasing an amount of work otherwise produced from the power stroke.

12. A method for operating an internal combustion engine including a combustion chamber and configured to perform at least a compression stroke and a power stroke, the method comprising:

expanding a first substance having a negative Joule-Thomson coefficient into the combustion chamber during a power stroke, thereby increasing an amount of work otherwise produced from the power stroke; and introducing the first substance at a temperature that is 500° C. or greater than a temperature inside the combustion chamber.

13. The method of claim 12, further comprising pre-heating the first substance prior to expanding into the combustion chamber.

14. The method of claim 12, further comprising introducing ions of a negative Joule-Thomson coefficient substance into the combustion chamber during the power stroke.

15. The method of claim 12, wherein the first substance is expanded into the combustion chamber at a crank angle of between greater than or equal to 0° and less than or equal to 10° after top dead center.

16. The method of claim 12, wherein the first substance is pressurized to a pressure of 5000 psi or greater than the pressure inside the combustion chamber prior to expansion into the combustion chamber.

17. The method of claim 12, wherein the first substance is selected from the group consisting of neon, helium, and hydrogen.

18. The method of claim 12, further comprising direct injecting a second substance having a positive Joule-Thomson coefficient into the combustion chamber during a compression stroke, thereby decreasing an amount of work otherwise required to perform the compression stroke.

* * * * *